(12) United States Patent
Hirata et al.

(10) Patent No.: US 11,505,661 B2
(45) Date of Patent: Nov. 22, 2022

(54) FIBER REINFORCED THERMOPLASTIC RESIN MOLDED ARTICLE AND FIBER REINFORCED THERMOPLASTIC RESIN MOLDING MATERIAL

(71) Applicant: TORAY INDUSTRIES, INC., Tokyo (JP)

(72) Inventors: Shin Hirata, Nagoya (JP); Sadayuki Kobayashi, Nagoya (JP); Keiichiro Nomura, Nagoya (JP)

(73) Assignee: TORAY INDUSTRIES, INC., Tokyo (JP)

( * ) Notice: Subject to any disclaimer, the term of this patent is extended or adjusted under 35 U.S.C. 154(b) by 357 days.

(21) Appl. No.: 16/958,873

(22) PCT Filed: Jan. 23, 2019

(86) PCT No.: PCT/JP2019/002057
§ 371 (c)(1),
(2) Date: Jun. 29, 2020

(87) PCT Pub. No.: WO2019/146633
PCT Pub. Date: Aug. 1, 2019

(65) Prior Publication Data
US 2020/0347193 A1 Nov. 5, 2020

(30) Foreign Application Priority Data
Jan. 26, 2018 (JP) .............................. JP2018-011444

(51) Int. Cl.
*C08J 5/04* (2006.01)
*C08L 23/12* (2006.01)
(Continued)

(52) U.S. Cl.
CPC .............. *C08J 5/04* (2013.01); *C08G 83/007* (2013.01); *C08L 23/12* (2013.01); *C08L 69/00* (2013.01);
(Continued)

(58) Field of Classification Search
CPC ................................. C08J 5/04; C08G 83/007
See application file for complete search history.

(56) References Cited

U.S. PATENT DOCUMENTS

2016/0340485 A1  11/2016  Nomura et al.
2017/0002154 A1  1/2017  Hiasa et al.
(Continued)

FOREIGN PATENT DOCUMENTS

EP  3118370 A1  1/2017
EP  3211025 A1  8/2017
(Continued)

OTHER PUBLICATIONS

International Search Report, issued in PCT/JP2019/002057, PCT/ISA/210, dated Mar. 19, 2019.
(Continued)

*Primary Examiner* — Arrie L Reuther
(74) *Attorney, Agent, or Firm* — Birch, Stewart, Kolasch & Birch, LLP

(57) ABSTRACT

There are provided a fiber reinforced thermoplastic resin molded article including a thermoplastic resin [A], carbon fibers [B] and a polyrotaxane [C], the thermoplastic resin [A], the carbon fibers [B] and the polyrotaxane [C] being included in amounts of 40 to 98 parts by weight, 1 to 40 parts by weight and 1 to 20 parts by weight, respectively, based on 100 parts by weight of the total content of the thermoplastic resin [A], the carbon fibers [B] and the polyrotaxane [C], wherein the carbon fibers [B] included in the molded article have a weight-average fiber length [Lw] in a range of 0.5 to
(Continued)

20 mm, and a ratio ([C]/[B]) of the content of the polyrotaxane [C] to that of the carbon fibers [B] is 0.04 or more and 0.5 or less; and a thermoplastic resin molded article which has excellent impact strength and also has excellent conductivity.

6 Claims, 2 Drawing Sheets

(51) Int. Cl.
*C08L 69/00* (2006.01)
*C08G 83/00* (2006.01)

(52) U.S. Cl.
CPC ........ *C08J 2323/12* (2013.01); *C08J 2369/00* (2013.01); *C08J 2447/00* (2013.01); *C08J 2463/00* (2013.01); *C08L 2205/025* (2013.01); *C08L 2205/035* (2013.01); *C08L 2207/04* (2013.01)

(56) References Cited

U.S. PATENT DOCUMENTS

2018/0208764 A1 7/2018 Ando et al.
2019/0309164 A1 10/2019 Takamoto et al.

FOREIGN PATENT DOCUMENTS

| JP | 2016-56308 A | 4/2016 |
|---|---|---|
| WO | WO 2015/137206 A1 | 9/2015 |
| WO | WO 2017/057521 A1 | 4/2017 |
| WO | WO 2018/043025 A1 | 3/2018 |

OTHER PUBLICATIONS

Written Opinion of the International Searching Authority, issued in PCT/JP2019/002057, PCT/ISA/237, dated Mar. 19, 2019.
Extended European Search Report for European Application No. 19743479.8, dated Aug. 27, 2021.
Tardy et al., "Self-Assembled Stimuli-Responsive Polyrotaxane Core-Shell Particles," Biomacromolecules, vol. 15, No. 1, Dec. 13, 2013, pp. 53-59.
Tuncel et al., "Catalytic Self-Threading: A New Route for the Synthesis of Polyrotaxanes," Macromolecules, vol. 37, No. 2, 2004 (Available online Dec. 23, 2003), pp. 288-302.

FIBER REINFORCED THERMOPLASTIC RESIN MOLDED ARTICLE AND FIBER REINFORCED THERMOPLASTIC RESIN MOLDING MATERIAL

TECHNICAL FIELD

The present invention relates to a fiber reinforced thermoplastic resin molded article and a fiber reinforced thermoplastic resin molding material each comprising a thermoplastic resin and carbon fibers. More particularly, the present invention relates to a fiber reinforced thermoplastic resin molded article capable of exhibiting excellent impact strength and electrical properties, and a fiber reinforced thermoplastic resin molding material suited for the fiber reinforced thermoplastic resin molded article.

BACKGROUND ART

Molded articles comprising reinforcing fibers and a thermoplastic resin are lightweight and have excellent mechanical properties, and are therefore widely used in sporting goods applications, aerospace applications and general industrial applications including electric/electronic applications and automobile applications. The reinforcing fibers used in these molded articles reinforce the molded articles in various forms according to applications thereof. In the molded articles, the reinforcing fibers used are metal fibers such as aluminum fibers and stainless steel fibers, organic fibers such as aramid fibers and PBO (polyparaphenylene benzoxazole) fibers, inorganic fibers such as silicon carbide fibers, carbon fibers and the like. Of these reinforcing fibers, from the viewpoint of the balance among specific strength, specific stiffness and lightweight properties, carbon fibers are preferable, and polyacrylonitrile (PAN)-based carbon fibers are particularly preferably used.

Because of the excellent specific strength and specific stiffness of carbon fibers, molded articles reinforced with carbon fibers have excellent mechanical properties. However, in applications for members of electric/electronic devices, with the requirements of miniaturization as well as further weight reduction and thinning of products, there is a need for further improvement in mechanical properties, particularly impact strength.

Carbon fibers have excellent conductivity and, for example, when a thermoplastic resin reinforced with carbon fibers is used as a structural body requiring electromagnetic wave shielding property, such as an electrical component storage container, current may not flow to the ground side due to low conductivity in the case of electric leakage accident, resulting in electric shock. Therefore, there has been required a reinforced thermoplastic resin molded article having more excellent conductivity.

There has been proposed, as a molding material having excellent dispersibility and fluidity, a molding material including at least a reinforcing fiber bundle, a thermoplastic polymer and a thermoplastic resin (see, for example, Patent Document 1). There has been proposed, as a resin composition having excellent toughness, a resin composition prepared by mixing a polyamide and a polyrotaxane (see, for example, Patent Document 2). There have also been proposed sizing agent-coated reinforcing fibers in which a sizing agent containing a polyrotaxane is coated to allow a fiber reinforced composite material to exhibit the toughness (see, for example, Patent Document 3).

PRIOR ART DOCUMENTS

Patent Documents

Patent Document 1: JP 10-138379 A
Patent Document 2: WO 2016/167247
Patent Document 3: WO 2015/137206

SUMMARY OF THE INVENTION

Problems to be Solved by the Invention

However, the molded articles obtained by the techniques disclosed in Patent Documents 1 to 3 had a problem of insufficiency in impact strength and conductivity. In light of the problems of the prior art, an object of the present invention is to provide a fiber reinforced thermoplastic resin molded article having excellent impact strength, high drop-weight impact absorption energy and excellent conductivity.

Solutions to the Problems

To solve the problems mentioned above, the present invention has the following constitution.
(1) A fiber reinforced thermoplastic resin molded article including a thermoplastic resin [A], carbon fibers [B] and a polyrotaxane [C], the thermoplastic resin [A], the carbon fibers [B] and the polyrotaxane [C] being included in amounts of 40 to 98 parts by weight, 1 to 40 parts by weight and 1 to 20 parts by weight, respectively, based on 100 parts by weight of the total content of the thermoplastic resin [A], the carbon fibers [B] and the polyrotaxane [C], wherein the carbon fibers [B] included in the molded article have a weight-average fiber length [$L_w$] in a range of 0.5 to 20 mm, and a ratio ([C]/[B]) of the content of the polyrotaxane [C] to that of the carbon fibers [B] is 0.04 or more and 0.5 or less.
(2) A fiber reinforced thermoplastic resin molding material including a thermoplastic resin [A], carbon fibers [B] and a polyrotaxane [C], the thermoplastic resin [A], the carbon fibers [B] and the polyrotaxane [C] being included in amounts of 40 to 98 parts by weight, 1 to 40 parts by weight and 1 to 20 parts by weight, respectively, based on 100 parts by weight of the total content of the thermoplastic resin [A], the carbon fibers [B] and the polyrotaxane [C], wherein a ratio ([C]/[B]) of the content of the polyrotaxane [C] to that of the carbon fibers [B] is 0.04 or more and 0.5 or less, and the length of the carbon fibers [B] and the length of the fiber reinforced thermoplastic resin molding material are substantially the same.

Effects of the Invention

The fiber reinforced thermoplastic resin molded article of the present invention has excellent impact strength and conductivity. The fiber reinforced thermoplastic resin molded article of the present invention is extremely useful as various components/members such as components, internal members and housings for electric/electronic devices, OA devices, household electrical appliances and automobiles.

EMBODIMENTS OF THE INVENTION

Figure 1:
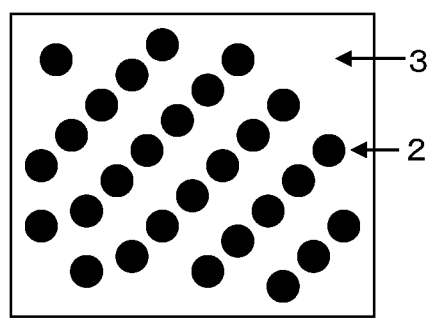
FIG. 1 is a schematic view illustrating an example of a transverse cross-sectional form of a fiber bundle [G] in the present invention.

The fiber reinforced thermoplastic resin molded article of the present invention (hereinafter sometimes referred to as "molded article") is a molded article including a thermoplastic resin [A], carbon fibers [B] and a polyrotaxane [C], the thermoplastic resin [A], the carbon fibers [B] and the polyrotaxane [C] being included in amounts of 40 to 98 parts by weight (40 parts by weight or more and 98 parts by weight or less), 1 to 40 parts by weight (1 part by weight or more and 40 parts by weight or less) and 1 to 20 parts by weight (1 part by weight or more and 20 parts by weight or less), respectively, based on 100 parts by weight of the total content of the thermoplastic resin [A], the carbon fibers [B] and the polyrotaxane [C]. The carbon fibers [B] have a weight-average fiber length [Lw] in a range of 0.5 to 20 mm, and a ratio ([C]/[B]) of the content of the polyrotaxane [C] to that of the carbon fibers [B] is 0.04 or more and 0.5 or less.

The content of the carbon fibers [B] in the molded article of the present invention is 1 part by weight or more and 40 parts by weight or less based on 100 parts by weight of the total content of the thermoplastic resin [A], the carbon fibers [B] and the polyrotaxane [C]. If the content of the carbon fibers [B] is less than 1 part by weight, mechanical properties, particularly bending strength and impact strength of the molded article may be degraded. The content of the carbon fibers [B] is preferably 5 parts by weight or more, and more preferably 7 parts by weight or more. If the content of the carbon fibers [B] is more than 40 parts by weight, the dispersibility of the carbon fibers [B] in the molded article may be degraded, and therefore mechanical properties, particularly impact strength of the molded article may be often degraded. The content of the carbon fibers [B] is preferably 35 parts by weight or less.

The content of the polyrotaxane [C] in the molded article of the present invention is 1 part by weight or more and 20 parts by weight or less based on 100 parts by weight of the total content of the thermoplastic resin [A], the carbon fibers [B] and the polyrotaxane [C]. If the content of the polyrotaxane [C] is less than 1 part by weight, the stress relaxation effect of the polyrotaxane [C] is not easily exhibited, and therefore the toughness, i.e. impact strength of the molded article may be degraded. The content of the polyrotaxane [C] is preferably 1.5 parts by weight or more. Meanwhile, if the content of the polyrotaxane [C] is more than 20 parts by weight, the amount included in the thermoplastic resin [A] relatively decreases, leading to degradation of the moldability, which is unpreferable. By adjusting the content of the polyrotaxane [C] to 20 parts by weight or less, the moldability can be maintained. The content of the polyrotaxane [C] is preferably 15 parts by weight or less, and more preferably 10 parts by weight or less.

The weight-average fiber length ($L_w$) of the carbon fibers [B] existing inside the molded article is preferably 0.5 to 20 mm (0.5 mm or more and 20 mm or less). When an impact is applied to the molded article, cracks generated inside the molded article progress while bypassing the carbon fibers, peeling the interface between the carbon fibers and the thermoplastic resin, breaking or pulling-out the carbon fibers. At this time, because of large energy absorption due to the breakage or pulling-out of the carbon fibers, it is considered that the impact strength of the molded article is improved as the breakage or pulling-out of the carbon fibers occur more easily when cracks progresses. As the carbon fibers existing inside the molded article becomes longer, it becomes more difficult to bypass the carbon fibers when cracks progress, so that the breakage or pulling-out of the carbon fibers easily occurs and the friction during pulling-out increases, thus making it possible to improve the impact strength of the molded article.

By adjusting the weight-average fiber length [$L_w$] of the carbon fibers [B] existing inside the molded article in the above range, conductive networks formed by the carbon fibers [B] function more efficiently, leading to high conductivity.

By including the polyrotaxane [C] mentioned later, the formation of conductive networks of the carbon fibers [B] is promoted, and therefore higher conductivity is exhibited as compared with the case of the carbon fibers [B] alone.

In the molded article, if the weight-average fiber length [$L_w$] of the carbon fibers [B] is less than 0.5 mm, the mechanical strength, particularly impact strength decreases because of small pull-out energy of the carbon fibers [B] in the molded article. Moreover, the formation of the conductive networks caused by the contact between the carbon fibers [B] becomes insufficient, leading to the degradation of the conductivity of the molded article. If $L_w$ is 0.5 mm or more, a decrease in impact strength of the molded article can be suppressed. $L_w$ is preferably 0.7 mm or more. By adjusting $L_w$ of the carbon fibers [B] to 20 mm or less, the entanglement between single fibers of the carbon fibers [B] is suppressed and degradation of the dispersibility is suppressed, thus making it possible to suppress a decrease in impact strength of the molded article. $L_w$ is more preferably 15 mm or less, and still more preferably 10 mm or less. If $L_w$ is more than 20 mm, a pattern of the carbon fibers on a surface of the molded article easily appears remarkably, thus causing poor appearance.

The term "weight-average fiber length" of the carbon fibers [B] in the present invention does not mean the weight-average molecular weight in which a number-average is taken by applying a method for calculating a weight-average molecular weight to the calculation of the fiber length, but the weight-average molecular weight to be calculated from the following formula that considers the contribution of the fiber length. However, the following formula is applied when the fiber diameter and the density of the carbon fibers [B] are constant.

$$\text{Weight-average fiber length} = \Sigma(Mi^2 \times Ni)/\Sigma(Mi \times Ni)$$

where
  Mi: Fiber length (mm)
  Ni: Number of carbon fibers having a fiber length Mi The weight-average fiber length can be measured by the following method. A molded article is heated on a hot stage set at 200 to 350° C. in a state of being sandwiched between two glass plates to obtain a film in which the carbon fibers [B] are uniformly dispersed. The film in which the carbon fibers [B] are uniformly dispersed is observed using an optical microscope at a magnification of 50 to 200 times. The fiber length of 1,000 carbon fibers [B] selected at random is measured and the weight-average fiber length ($L_w$) is calculated from the above formula.

The weight-average fiber length ($L_w$) of the carbon fibers [B] in the molded article can be adjusted, for example, by molding conditions. Examples of molding conditions include pressure conditions such as back pressure, time conditions such as injection time, and temperature conditions such as cylinder temperature and mold temperature in the case of injection molding. By increasing the pressure conditions such as back pressure, the shearing force in the cylinder increases, and therefore the fibers break and become shorter. Shortening the injection time also increases the shear force during injection, thus shortening the fiber length. Regarding the temperature conditions, lowering the temperature increases the resin viscosity and increases the shearing force, thus shortening the fiber length. In the present invention, by appropriately changing the conditions as mentioned above, it is possible to adjust the weight-average fiber length ($L_w$) of the carbon fibers [B] in the molded article in a desired range.

In the molded article of the present invention, a ratio ([C]/[B]) of the content of the polyrotaxane [C] to that of the carbon fibers [B] is 0.04 or more and 0.5 or less. Since the polyrotaxane [C] has a lower melt viscosity than that of the thermoplastic resin [A], the polyrotaxane [C] more easily flows in the cylinder during injection molding than the thermoplastic resin [A]. This makes it possible to create a situation in which the polyrotaxane [C] is easily localized in the vicinity of the carbon fibers [B] in the matrix resin. By adjusting the content in above range, the stress relaxation effect of the polyrotaxane [C] on the carbon fibers [B] is easily exerted, thus improving the impact strength and the drop-weight impact absorption energy of the molded article.

As mentioned above, since the polyrotaxane [C] can exist between the carbon fibers [B] and the thermoplastic resin [A], it is possible to suppress the breakage of the carbon fibers [B] due to the shear stress in the cylinder during injection molding. It is also possible to effectively suppress the progress of cracks into the carbon fibers [B] that occur during the breakage of the molded article.

When the carbon fibers [B] in which the polyrotaxane [C] is localized in the vicinity is dispersed in the thermoplastic resin [A] during molding due to shear or flow during molding, the carbon fibers [B] can come into contact with each other through the polyrotaxane [C]. Then, the distance between the single fibers in conductive networks formed by the carbon fibers [B] mentioned above decreases, thus making it possible to exhibit more excellent conductivity. A ratio ([C]/[B]) of the content of the polyrotaxane [C] to that of the carbon fibers [B] is preferably 0.05 or more, more preferably 0.1 or more, and still more preferably 0.15 or more.

If the ratio ([C]/[B]) of the content of the polyrotaxane [C] to that of the carbon fibers [B] is less than 0.04, in addition to the reason of low effect of improving the toughness of the molded article and a decrease in impact strength and drop-weight impact absorption energy, localization of the polyrotaxane [C] in the vicinity of the carbon fibers [B] hardly occurs, leading to degradation of the conductivity. Meanwhile, if the ratio ([C]/[B]) is more than 0.5, the ratio of the polyrotaxane [C] in the molded article relatively becomes too large relative to the thermoplastic resin [A], leading to degradation of the heat resistance of the molded article. The ratio is preferably 0.45 or less, more preferably 0.4 or less, and still more preferably 0.25 or less.

Next, constituent components of the molded article of the present invention will be described in detail.

In the present invention, the thermoplastic resin [A] preferably has a molding temperature (melting temperature) of 200 to 450° C., and examples thereof include polyolefin resins, polystyrene resins, polyamide resins, vinyl halide resins, polyacetal resins, saturated polyester resins, polycarbonate resins, polyaryl sulfone resins, polyaryl ketone resins, polyarylene ether resins, polyarylene sulfide resins, polyaryl ether ketone resins, polyether sulfone resins, polyarylene sulfide sulfone resins, polyarylate resins, liquid crystal polyesters, fluororesins and the like. All of these resins act as an electrical insulator. Two or more of these resins can also be used in combination. Terminal groups of these resins may be blocked or modified.

When using in applications of electric/electronic devices and automobile components, at least one resin selected from the group consisting of a polycarbonate resin, a polyolefin resin, a polyamide resin and a polyarylene sulfide resin, which are lightweight and are excellent in balance between mechanical properties and moldability, is more preferable among these thermoplastic resins.

The polyolefin resin is preferably a polypropylene resin. In the present invention, the polypropylene resin may be either unmodified or modified.

Examples of the unmodified polypropylene resin include homopolymers of propylene, random copolymers of propylene and at least one of α-olefin, conjugated diene, non-conjugated diene and other thermoplastic monomers, or block copolymers. Examples of the α-olefin include α-olefins having 2 to 12 carbon atoms excluding propylene, such as ethylene, 1-butene, 3-methyl-1-butene, 4-methyl-1-pentene, 3-methyl-1-pentene, 4-methyl-1-hexene, 4,4-dimethyl-1-hexene, 1-nonene, 1-octene, 1-heptene, 1-hexene, 1-decene, 1-undecene and 1-dodecene. Examples of the conjugated diene and the non-conjugated diene include butadiene, ethylidene norbornene, dicyclopentadiene, 1,5-hexadiene and the like. Two or more of these resins may be used in combination.

Specifically, preferable examples include polypropylenes, ethylene-propylene copolymers, propylene-1-butene copolymers, ethylene-propylene-1-butene copolymers and the like. Homopolymers of propylene are preferable from the viewpoint of improving the rigidity of the molded article, and random or block copolymers of propylene and at least one of α-olefin, conjugated diene and non-conjugated diene are preferable from the viewpoint of improving the impact strength of the molded article.

The modified polypropylene resin is preferably an acid-modified polypropylene resin, and more preferably an acid-modified polypropylene resin having a group of carboxylic acid and/or a salt thereof bound to a polymer chain. The acid-modified polypropylene resin can be obtained by various methods. For example, the acid-modified polypropylene resin can be obtained by graft polymerization of an unmodified polypropylene resin with a monomer having a carboxylic acid group which is neutralized or not neutralized, and/or a monomer having a carboxylic acid ester group which is saponified or not saponified. It is also possible to include compounds having an unsaturated vinyl group other than olefin.

Examples of the monomer having a carboxylic acid group which is neutralized or not neutralized and the monomer having a carboxylic acid ester group which is saponified or not saponified include ethylenically unsaturated carboxylic acids, anhydrides thereof, and esterified products thereof.

Examples of the ethylenically unsaturated carboxylic acid include (meth)acrylic acid, maleic acid, fumaric acid, tetrahydrophthalic acid, itaconic acid, citraconic acid, crotonic acid, isocrotonic acid and the like. Examples of the anhydride thereof include nadic acid TM (endocis-bicyclo[2,2, 1]hept-5-ene-2,3-dicarboxylic acid), maleic anhydride, citraconic anhydride and the like.

Examples of the esterified product of the ethylenically unsaturated carboxylic acid include (meth)acrylic acid esters such as methyl (meth)acrylate, ethyl (meth)acrylate, propyl (meth)acrylate, n-butyl (meth)acrylate, iso-butyl (meth) acrylate, tert-butyl (meth)acrylate, n-amyl (meth)acrylate, isoamyl (meth)acrylate, n-hexyl (meth)acrylate, 2-ethylhexyl (meth)acrylate, octyl (meth)acrylate, decyl (meth) acrylate, dodecyl (meth)acrylate, octadecyl (meth)acrylate, stearyl (meth)acrylate, tridecyl (meth)acrylate, lauroyl (meth)acrylate, cyclohexyl (meth)acrylate, benzyl (meth) acrylate, phenyl (meth)acrylate, isobornyl (meth)acrylate, dicyclopentanyl (meth)acrylate, dicyclopentenyl (meth) acrylate, dimethylaminoethyl (meth)acrylate and diethylaminoethyl (meth)acrylate; hydroxyl group-containing (meth)acrylic acid esters such as hydroxyethyl acrylate, 2-hydroxyethyl (meth)acrylate, 2-hydroxypropyl (meth) acrylate, 4-hydroxybutyl acrylate, lactone-modified hydroxyethyl (meth)acrylate and 2-hydroxy-3-phenoxypropyl acrylate; epoxy group-containing (meth)acrylic acid esters such as glycidyl (meth)acrylate and methyl glycidyl (meth)acrylate; and aminoalkyl (meth)acrylates such as N,N-dimethylaminoethyl (meth)acrylate, N,N-diethylaminoethyl (meth) acrylate, N,N-dimethylaminopropyl (meth) acrylate, N,N-dipropylaminoethyl (meth) acrylate, N,N-dibutylaminoethyl (meth)acrylate and N,N-dihydroxyethylaminoethyl (meth) acrylate.

Examples of the monomer having an unsaturated vinyl group other than olefin include isocyanate group-containing vinyls such as vinyl isocyanate and isopropenyl isocyanate; aromatic vinyls such as styrene, α-methylstyrene, vinyltoluene and t-butylstyrene; amide group-containing vinyls such as (meth)acrylamide, N-methylol (meth)acrylamide, diacetone acrylamide and maleic acid amide; vinyl esters such as vinyl acetate and vinyl propionate; unsaturated sulfonic acids such as styrenesulfonic acid, sodium styrenesulfonate and 2-acrylamido-2-methylpropanesulfonic acid; and unsaturated phosphoric acids such as mono(2-(meth)acryloyloxyethyl)acid phosphate.

Two or more of these monomers can also be used in combination. Of these, acid anhydrides of the ethylenically unsaturated carboxylic acid are preferable, and maleic anhydrides are still more preferable.

To improve mechanical properties of the molded article, both the unmodified polypropylene resin and the modified polypropylene resin are preferably used. From the viewpoint of the balance between flame retardancy and mechanical properties, the unmodified polypropylene resin and the modified polypropylene resin are preferably used in a weight ratio of 95/5 to 75/25, more preferably 95/5 to 80/20, and still more preferably 90/10 to 80/20.

The polyamide resin is a resin produced using amino acids, lactams, or diamines and dicarboxylic acids as main raw materials. Examples of the raw material include amino acids such as 6-aminocaproic acid, 11-aminoundecanoic acid, 12-aminododecanoic acid and para-aminomethylbenzoic acid; lactams such as ε-caprolactam and ω-laurolactam; aliphatic diamines such as tetramethylenediamine, hexamethylenediamine, 2-methylpentamethylenediamine, nonamethylenediamine, undecamethylenediamine, dodecamethylenediamine, 2,2,4-/2,4,4-trimethylhexamethylenediamine and 5-methylnonamethylenediamine; aromatic diamines such as metaxylylenediamine and paraxylylenediamine; alicyclic diamines such as 1,3-bis(aminomethyl)cyclohexane, 1,4-bis(aminomethyl)cyclohexane, 1-amino-3-aminomethyl-3,5,5-trimethylcyclohexane, bis(4-aminocyclohexyl) methane, bis(3-methyl-4-aminocyclohexyl)methane, 2,2-bis (4-aminocyclohexyl)propane, bis(aminopropyl)piperazine and aminoethylpiperazine; aliphatic dicarboxylic acids such as adipic acid, suberic acid, azelaic acid, sebacic acid and dodecanedioic acid; aromatic dicarboxylic acids such as terephthalic acid, isophthalic acid, 2-chloroterephthalic acid, 2-methylterephthalic acid, 5-methylisophthalic acid, 5-sodium sulfoisophthalic acid, hexahydroterephthalic acid and hexahydroisophthalic acid; and alicyclic dicarboxylic acids such as 1,4-cyclohexane dicarboxylic acid, 1,3-cyclohexane dicarboxylic acid and 1,2-cyclohexanedicarboxylic acid. Two or more of these compounds may be used in combination.

A polyamide resin having a melting point of 200° C. or higher is particularly useful, because of excellent heat resistance and strength thereof. Specific examples of the polyamide resin include polycapramide (nylon 6), polyhexamethylene adipamide (nylon 66), polycapramide/polyhexamethylene adipamide copolymer (nylon 6/66), polytetramethylene adipamide (nylon 46), polyhexamethylene sebacamide (nylon 610), polyhexamethylene dodecamide (nylon 612), polyhexamethylene terephthalamide/polycapramide copolymer (nylon 6T/6), polyhexamethylene adipamide/polyhexamethylene terephthalamide copolymer (nylon 66/6T), polylaurylamide/polyhexamethylene terephthalamide copolymer (nylon 12/6T), polyhexamethylene adipamide/polyhexamethylene isophthalamide copolymer (nylon 66/6I), polyhexamethylene adipamide/polyhexamethylene terephthalamide/polyhexamethylene isophthalamide copolymer (nylon 66/6T/6I), polyhexamethylene adipamide/polyhexamethylene isophthalamide/polycapramide copolymer (nylon 66/6I/6), polyhexamethylene terephthalamide/polyhexamethylene isophthalamide copolymer (nylon 6T/6I), polyhexamethylene terephthalamide/polydodecanamide copolymer (nylon 6T/12), polyhexamethylene terephthalamide/poly(2-methylpentamethylene) terephthalamide copolymer (nylon 6T/M5T), polymetaxylylene adipamide (nylon MXD6), polynonamethylene terephthalamide (nylon 9T) and copolymers thereof. Two or more of these polyamide resins may be used in combination.

The degree of polymerization of the polyamide resin is not particularly limited. The sulfuric acid relative viscosity $\eta_r$ of a solution prepared by dissolving 0.25 g of a polyamide resin in 25 ml of 98% concentrated sulfuric acid as measured at 25° C. is preferably 1.5 to 5.0, and more preferably 2.0 to 3.5, because the fluidity of the polyamide resin during molding is excellent and a thin molded article can be easily produced. The sulfuric acid relative viscosity $\eta_r$ is expressed, from a flow down speed of a 98% sulfuric acid solution having a resin concentration of 1 g/100 ml as measured in a thermostatic chamber at 25° C. using an Ostwald viscometer, by a ratio of viscosity (ratio of the number of seconds required for flow down) of a sample solution to that of 98% sulfuric acid.

A polycarbonate resin is a resin produced by reacting a dihydric phenol with a carbonate precursor. The polycarbonate resin may be a copolymer produced using two or more dihydric phenols or two or more carbonate precursors. Examples of the reaction method include an interfacial polymerization method, a melt transesterification method, a carbonate prepolymer solid-phase transesterification method, and a cyclic carbonate compound ring-opening polymerization method. It is possible to use, as a known polycarbonate resin, a polycarbonate resin disclosed, for example, in JP 2002-129027 A.

Examples of the dihydric phenol include 1,1-bis(4-hydroxyphenyl)-3,3,5-trimethylcyclohexane, bis(4-hydroxyphenyl)alkane (e.g., bisphenol A), 2,2-bis{(4-hydroxy-3-methyl)phenyl}propane, α,α'-bis(4-hydroxyphenyl)-m-diisopropylbenzene and 9,9-bis(4-hydroxy-3-methylphenyl)fluorene. Two or more of these dihydric phenols may be used in combination. Of these dihydric phenols, bisphenol A is preferable and a polycarbonate resin having more superior impact strength can be produced. A copolymer produced using bisphenol A and another dihydric phenol is excellent because of the high heat resistance or low water absorbability thereof.

Examples of the carbonate precursor include a carbonyl halide, a carbonic acid diester and a haloformate. Specific examples include phosgene, diphenyl carbonate and a dihaloformate of a dihydric phenol.

In the production of a polycarbonate resin from the above-mentioned dihydric phenol and the above carbonate precursor, a catalyst, a chain terminator, an antioxidant agent for preventing the oxidation of the dihydric phenol and the like may be used, if necessary.

The polycarbonate resin may be a branched polycarbonate resin produced by copolymerizing a tri- or higher functional aromatic compound, a polyester carbonate resin produced by copolymerizing an aromatic or aliphatic (including alicyclic) difunctional carboxylic acid, a copolymerized polycarbonate resin produced by copolymerizing a difunctional (including alicyclic) alcohol, or a polyester carbonate resin produced by copolymerizing a difunctional carboxylic acid and a difunctional alcohol together. These polycarbonate resins are also known. Two or more of these polycarbonate resins may be used in combination.

The molecular weight of the polycarbonate resin is not limited, and a polycarbonate resin having a viscosity-average molecular weight of 10,000 to 50,000 is preferable. If the viscosity-average molecular weight is 10,000 or more, the strength of the molded article can be further improved. The viscosity-average molecular weight is more preferably 15,000 or more, and still more preferably 18,000 or more. Meanwhile, if the viscosity-average molecular weight is 50,000 or less, the moldability can be improved. The viscosity-average molecular weight is more preferably 40,000 or less, still more preferably 30,000 or less. When using two or more of polycarbonate resins, it is preferable that the viscosity-average molecular weight of at least one of the polycarbonate resins is in the above range. In this case, it is preferable to use, as the other polycarbonate resin, a polycarbonate resin having a viscosity-average molecular weight of more than 50,000, and preferably more than 80,000. This polycarbonate resin has high entropy elasticity and is therefore advantageous when a gas-assist molding technique or the like is employed in combination. In addition, this polycarbonate resin can exhibit properties associated with the high entropy elasticity (e.g., dripping prevention properties, draw down properties, and properties of improving melt properties such as the improvement in jetting).

The viscosity-average molecular weight (M) of the polycarbonate resin is determined by substituting a specific viscosity (ηsp), which is measured on a solution prepared by dissolving 0.7 g of polycarbonate in 100 ml of methylene chloride at 20° C., into the following formula.

$\eta sp/c=[\eta]+0.45\times[\eta]2c$ (wherein $[\eta]$ represents a limiting viscosity)

$[\eta]=1.23\times10^{-4}M^{0.83}$ c=0.7

The melt viscosity of the polycarbonate resin is not limited, and the melt viscosity at 200° C. is preferably 10 to 25,000 Pa·s. If the melt viscosity at 200° C. is 10 Pa·s or more, the strength of the molded article can be further improved. The melt viscosity is more preferably 20 Pa·s or more, and still more preferably 50 Pa·s or more. Meanwhile, if the melt viscosity at 200° C. is 25,000 Pa·s or less, the moldability is improved. The melt viscosity is more preferably 20,000 Pa·s or less, and still more preferably 15,000 Pa·s or less.

It is also possible to use, as the polycarbonate resin, commercially available products such as "Iupilon" (registered tradename) and "Novarex" (registered tradename) manufactured by Mitsubishi Engineering-Plastics Corporation, "Panlite" (registered tradename) manufactured by Teijin Chemicals Ltd., "Tarflon" (registered tradename) manufactured by Idemitsu Petrochemical Co., Ltd. and the like.

Examples of the polyarylene sulfide resin include a polyphenylene sulfide (PPS) resin, a polyphenylene sulfide sulfone resin, a polyphenylene sulfide ketone resin, and random or block copolymers thereof. Two or more of these polyarylene sulfide resins may be used in combination. Of these polyarylene sulfide resins, a polyphenylene sulfide resin is particularly preferably used.

The polyarylene sulfide resin can be produced by any method, such as a method for producing a polymer having a relatively small molecular weight mentioned in JP 45-3368 B, and a method for producing a polymer having a relatively large molecular weight mentioned in JP 52-12240 B and JP 61-7332 A.

The polyarylene sulfide resin thus obtained may be subjected to various treatments, such as crosslinking/polymerization by heating in the air, heat treatment in an atmosphere of inert gas such as nitrogen or under reduced pressure, washing with an organic solvent, hot water, an aqueous acidic solution or the like, activation with a functional group-containing compound such as an acid anhydride, an amine, an isocyanate, a functional group-containing disulfide compound or the like.

It is possible to exemplify, as the method in which a polyarylene sulfide resin is crosslinked/polymerized by heating, a method in which heating is performed until a desired melt viscosity can be achieved at a predetermined temperature in an atmosphere of oxidative gas such as air or oxygen, or an atmosphere of a mixed gas of the oxidative gas and inert gas such as nitrogen or argon. The heating treatment temperature is preferably in a range of 200 to 270° C., and the heating treatment time is preferably in a range of 2 to 50 hours. The viscosity of the resultant polymer can be adjusted to the value in a desired range by controlling the treatment temperature and the treatment time. Examples of a heating treatment apparatus include a common hot-air drier, a rotating heating apparatus, and a heating apparatus equipped with an impeller blade. From the viewpoint of performing the heating treatment with high efficiency and more uniformly, it is preferable to use a rotating heating apparatus or a heating apparatus equipped with an impeller blade.

When the polyarylene sulfide resin is subjected to a heat treatment in an atmosphere of inert gas such as nitrogen or under reduced pressure, the heat treatment temperature is preferably in a range of 200 to 270° C., and the heat treatment time is preferably in a range of 2 to 50 hours. When the polyarylene sulfide resin is treated under reduced pressure, the pressure is preferably 7,000 Nm$^{-2}$ or less. Examples of a heating treatment apparatus include a common hot-air drier, a rotating heating apparatus, and a heating apparatus equipped with an impeller blade. From the viewpoint of performing the heating treatment with high efficiency and more uniformly, it is preferable to use a rotating heating apparatus or a heating apparatus equipped with an impeller blade.

When the polyarylene sulfide resin is washed with an organic solvent, examples of the organic solvent include nitrogen-containing polar solvents such as N-methylpyrrolidone, dimethylformamide and dimethylacetamide; sulfoxide/sulfone-based solvents such as dimethyl sulfoxide and dimethyl sulfone; ketone-based solvents such as acetone, methyl ethyl ketone, diethyl ketone and acetophenone; ether-based solvents such as dimethyl ether, dipropyl ether and tetrahydrofuran; halogen-based solvents such as chloroform, methylene chloride, trichloroethylene, ethylene dichloride, dichloroethane, tetrachloroethane and chlorobenzene; alcohol/phenol-based solvents such as methanol, ethanol, propanol, butanol, pentanol, ethylene glycol, propylene glycol, phenol, cresol and polyethylene glycol; and aromatic hydrocarbon-based solvents such as benzene, toluene and xylene. Two or more of these organic solvents may be used in combination. Of these organic solvents, N-methylpyrrolidone, acetone, dimethylformamide, chloroform and the like can be preferably used. It is possible to exemplify, as the method for washing with the organic solvent, a method in which a polyarylene sulfide resin is immersed in an organic solvent. If necessary, stirring or heating may also be performed appropriately. The washing temperature at which the polyarylene sulfide resin is washed in the organic solvent is preferably normal temperature to 150° C. It is preferable that the polyarylene sulfide resin that has been washed with the organic solvent is washed with water or warm water several times to remove the residual organic solvent.

When the polyarylene sulfide resin is washed with hot water, the water to be used is preferably distilled water or deionized water for the purpose of exerting preferable effect of chemical modification of the polyarylene sulfide resin by washing with hot water. Usually, washing with hot water is performed by introducing a predetermined amount of the polyarylene sulfide resin into a predetermined amount of hot water, followed by heating and stirring of the mixed solution under ambient pressure or in a pressure container. The liquor ratio of the polyarylene sulfide resin to water is preferably 200 g or less of the polyarylene sulfide resin per 1 liter of water.

It is possible to exemplify, as the method for treating the polyarylene sulfide resin with an acid, a method in which the polyarylene sulfide resin is immersed in an acid or an aqueous solution of an acid. If necessary, stirring or heating may also be performed appropriately. Examples of the acid include aliphatic saturated monocarboxylic acids such as formic acid, acetic acid, propionic acid and butyric acid; halo-substituted aliphatic saturated carboxylic acids such as chloroacetic acid and dichloroacetic acid; aliphatic unsaturated monocarboxylic acids such as acrylic acid and crotonic acid; aromatic carboxylic acids such as benzoic acid and salicylic acid; dicarboxylic acids such as oxalic acid, malonic acid, succinic acid, phthalic acid and fumaric acid; and inorganic acidic compounds such as sulfuric acid, phosphoric acid, hydrochloric acid, carbonic acid and silicic acid. Of these acids, acetic acid or hydrochloric acid is preferably used. It is preferable that an acid-treated polyarylene sulfide resin is washed with water or warm water several times to remove a residual acid or salt. The water to be used for washing is preferably distilled water or deionized water.

The melt viscosity of the polyarylene sulfide resin as measured under the conditions of 310° C. and a shear rate of 1,000/sec is preferably 80 Pa·s or less, and more preferably 20 Pa·s or less. The lower limit of the melt viscosity is not particularly limited, and is preferably 5 Pa·s or more. Two or more of polyarylene sulfide resins having different melt viscosities from each other may be used in combination. The melt viscosity can be measured using a device "Capilograph" (manufactured by Toyo Seiki Co. Ltd.) under the conditions of a die length of 10 mm and a die hole diameter of 0.5 to 1.0 mm.

It is also possible to use, as the polyarylene sulfide resin, commercially available products such as "Torelina" (registered tradename) manufactured by Toray Industries, Inc., "DIC.PPS" (registered tradename) manufactured by DIC Corporation, "Durafide" (registered tradename) manufactured by Polyplastics Co., Ltd. and the like.

The carbon fibers [B] can improve the mechanical properties of the molded article due to the fiber reinforcing effect on the thermoplastic resin [A]. Moreover, since the carbon fibers have properties such as conductivity and thermal conductivity, the conductivity and the thermal conductivity properties of the molded article can be improved even in the case of low conductivity and thermal conductivity of the thermoplastic resin [A] alone. From the viewpoint of further improving the mechanical properties and the weight reduction effect of the molded article, the carbon fibers are preferably PAN-based, pitch-based and rayon-based carbon fibers, and more preferably PAN-based carbon fibers from the viewpoint of the balance between the strength and the elastic modulus of the thus obtained molded article. To impart the conductivity, carbon fibers coated with metal such as nickel, copper or ytterbium are also preferably used.

The carbon fibers [B] preferably have a surface oxygen concentration ratio [O/C], which is the ratio of oxygen atoms (O) to carbon atoms (C) on the fiber surface as measured by X-ray photoelectron spectroscopy, of 0.05 to 0.5. If the surface oxygen concentration ratio is 0.05 or more, a sufficient amount of functional groups can be secured on the carbon fiber surface to provide stronger adhesion to the thermoplastic resin [A], thereby further improving the strength of the molded article. The surface oxygen concentration ratio is more preferably 0.08 or more, and still more preferably 0.1 or more. Meanwhile, the upper limit of the surface oxygen concentration ratio is not particularly limited. In general, the upper limit is preferably 0.5 or less in view of the balance between the handling properties and the productivity of the carbon fibers. The surface oxygen concentration ratio is more preferably 0.4 or less, and still more preferably 0.3 or less.

The surface oxygen concentration ratio of the carbon fibers [B] is determined by X-ray photoelectron spectroscopy according to the following procedure. First, when a sizing agent is deposited on the surface of the carbon fibers, the sizing agent deposited on the carbon fiber surface is removed with a solvent. A bundle of the carbon fibers is cut into a length of 20 mm, and the carbon fibers are spread on a sample support made of copper to be used as measurement samples. The measurement samples are set in a sample chamber of an X-ray photoelectron spectroscopy apparatus, and the measurement is performed while maintaining the interior of the sample chamber at $1\times10^{-8}$ Torr and using AlKα1, 2 as an X-ray source. As a correction value of a peak associated with electrification during the measurement, the kinetic energy value (K.E.) of the main peak of $C_{1s}$ is set at 1,202 eV. The $C_{1s}$ peak area is determined by drawing a straight baseline in the K.E. range of 1,191 to 1,205 eV. The $O_{1s}$ peak area is determined by drawing a straight baseline in the K.E. range of 947 to 959 eV.

The surface oxygen concentration ratio is calculated as a ratio of the number of atoms, from the ratio of the $C_{1s}$ peak area to the $O_{1s}$ peak area, using an apparatus-specific sensitivity correction value. When an X-ray photoelectron spectroscopy apparatus model ES-200 manufactured by Kokusai Denki Co., Ltd. is used, the sensitivity correction value is set at 1.74.

Examples of means for adjusting the surface oxygen concentration ratio [O/C] to 0.05 to 0.5 include, but are not particularly limited to, treatments such as electrolytic oxidation, chemical oxidation and gas phase oxidation, among which electrolytic oxidation is preferable.

The average fiber diameter of the carbon fibers [B] is not particularly limited and is preferably 1 to 20 μm, and more preferably 3 to 15 μm, from the viewpoint of the mechanical properties and the surface appearance of the molded article. The average fiber diameter as used herein is an average fiber diameter of a single fiber. When the carbon fibers are formed into a carbon fiber bundle, the number of single fibers is preferably, but not particularly limited to, 100 to 350,000, and more preferably 20,000 to 100,000 from the viewpoint of the productivity.

To improve the adhesion between the carbon fibers [B] and the thermoplastic resin [A] as a matrix resin, the carbon fibers [B] may be subjected to a surface treatment. Examples of the surface treatment include an electrolytic treatment, an ozonation treatment, a UV treatment and the like.

To prevent fluffing of the carbon fibers [B] or improve the adhesion between the carbon fibers [B] and the thermoplastic resin [A] as a matrix resin, the carbon fibers [B] may be coated with a sizing agent. Coating the carbon fibers [B] with the sizing agent allows for further improving the adhesion and the overall properties of the composite.

Specific examples of the sizing agent include epoxy resins, phenolic resins, polyethylene glycol, polyurethanes, polyesters, emulsifiers and surfactants. Two or more of these sizing agents may be used in combination. The sizing agent is preferably water-soluble or water-dispersible, and epoxy resins having high wettability with the carbon fibers [B] are preferable, and polyfunctional epoxy resins are more preferable.

Examples of polyfunctional epoxy resins include bisphenol A epoxy resins, bisphenol F epoxy resins, aliphatic epoxy resins, and phenol novolac epoxy resins. Of these, aliphatic epoxy resins, which readily exhibit adhesion to a matrix resin, are preferable. Aliphatic epoxy resins, due to their flexible backbones, tend to have a structure with high toughness even at a high crosslink density. The presence of aliphatic epoxy resin, which is flexible, between the carbon fibers and the matrix resin makes it difficult to cause delamination between both of them, thus enabling further improvement in the strength of the molded article.

Examples of the polyfunctional aliphatic epoxy resin include diglycidyl ether compounds and polyglycidyl ether compounds. Examples of the diglycidyl ether compound include ethylene glycol diglycidyl ether, polyethylene glycol diglycidyl ethers, propylene glycol diglycidyl ether, polypropylene glycol diglycidyl ethers, 1,4-butanediol diglycidyl ether, neopentyl glycol diglycidyl ether, polytetramethylene glycol diglycidyl ethers and polyalkylene glycol diglycidyl ethers. Examples of the polyglycidyl ether compound include glycerol polyglycidyl ether, diglycerol polyglycidyl ether, polyglycerol polyglycidyl ethers, sorbitol polyglycidyl ethers, arabitol polyglycidyl ethers, trimethylolpropane polyglycidyl ethers, trimethylolpropane glycidyl ethers, pentaerythritol polyglycidyl ethers, and polyglycidyl ethers of aliphatic polyhydric alcohol.

Of the above aliphatic epoxy resins, trifunctional or higher aliphatic epoxy resins are preferable, and aliphatic polyglycidyl ether compounds having three or more highly reactive glycidyl groups are more preferable. The aliphatic polyglycidyl ether compounds have good balance among the flexibility, the crosslink density and the compatibility with a matrix resin, and can further improve the adhesion. Of these, glycerol polyglycidyl ether, diglycerol polyglycidyl ether, polyglycerol polyglycidyl ethers, polyethylene glycol glycidyl ethers and polypropylene glycol glycidyl ethers are still more preferable.

The amount of the sizing agent deposited is preferably 0.01% to 10% by weight based on 100% by weight of the carbon fiber bundle including the sizing agent and the carbon fibers [B]. If the amount of the sizing agent deposited is 0.01% by weight or more, the adhesion to the thermoplastic resin [A] can be further improved. The amount of the sizing agent deposited is more preferably 0.05% by weight or more, and still more preferably 0.1% by weight or more. Meanwhile, if the amount of the sizing agent deposited is 10% by weight or less, the physical properties of the thermoplastic resin [A] can be maintained at a higher level. The amount of the sizing agent deposited is more preferably 5% by weight or less, and still more preferably 2% by weight or less.

Examples of the means for applying a sizing agent include, but are not particularly limited to, a method in which a sizing agent is dissolved or dispersed in a solvent or a dispersion medium to prepare a sizing treatment solution and the resulting sizing treatment solution is applied to the carbon fibers [B], and then the solvent is removed by drying and vaporizing. Examples of the method for applying the sizing treatment solution to the carbon fibers [B] include a method in which the carbon fibers [B] are immersed in the sizing treatment solution via a roller, a method in which the carbon fibers [B] are brought into contact with a roller coated with the sizing treatment solution, and a method in which the sizing treatment solution is sprayed over the carbon fibers [B] in the form of mists. The method for applying the sizing treatment solution may be a batch method or a continuous method, and preferred is the continuous method which allows for achieving higher productivity and smaller variation. In such a case, it is preferable to control the concentration of the sizing treatment solution, temperature, and yarn tension of the carbon fibers [B] so that the sizing agent can be uniformly deposited on the carbon fibers [B] in an amount in an appropriate range. It is more preferable to excite the carbon fibers [B] with ultrasonic waves when applying the sizing treatment solution.

The drying temperature and the drying time are adjusted depending on the amount of the sizing agent deposited. From the viewpoint of shortening the time required to completely remove and drying the solvent used in the sizing treatment solution, and preventing thermal degradation of the sizing agent thereby preventing the sized carbon fibers [B] from becoming rigid and poorly spreadable, the drying temperature is preferably 150° C. or higher and 350° C. or lower, and more preferably 180° C. or higher and 250° C. or lower.

Examples of the solvent to be used in the sizing treatment solution include water, methanol, ethanol, dimethylformamide, dimethylacetamide, acetone and the like. Of these, water is preferable from the viewpoint of ease of handling and disaster prevention. Therefore, when a compound insoluble or poorly soluble in water is used as the sizing agent, it is preferable to add an emulsifier and a surfactant to prepare an aqueous dispersion. Specific examples of the emulsifier and the surfactant include anionic emulsifiers such as styrene-maleic anhydride copolymers, olefin-maleic anhydride copolymers, naphthalene sulfonate formalin condensates and sodium polyacrylate; cationic emulsifiers such as polyethyleneimine and polyvinyl imidazoline; and nonionic emulsifiers such as nonylphenol ethylene oxide adducts, polyvinyl alcohol, polyoxyethylene ether ester copolymers and sorbitan ester ethyl oxide adducts. Of these, nonionic emulsifiers which cause little interaction are preferable, because they are less likely to inhibit the adhesive effect of functional groups contained in the sizing agent.

The molded article of the present invention is obtained by mixing a polyrotaxane [C]. The rotaxane commonly means a molecule having a shape in which a cyclic molecule passes through a dumbbell-shaped axle molecule (a linear molecule having a bulky blocking group at both ends, hereinafter referred to as "linear molecule") as mentioned, for example, in Harada, A., Li, J. & Kamachi, M., Nature 356, 325-327. When a plurality of cyclic molecules are passed through by one linear molecule, it is referred to as a polyrotaxane.

The polyrotaxane [C] is composed of a linear molecule and a plurality of cyclic molecules and has a structure in which the linear molecule passes through the opening part of a plurality of cyclic molecules, and also has a bulky blocking group at both ends of the linear molecule so as not to allow eliminating the cyclic molecule from the linear molecule. In the polyrotaxane [C], the cyclic molecule has a structure which enables free movement on the linear molecule, but does not enable the elimination from the linear molecule due to the blocking group. Namely, the linear molecule and the cyclic molecule have a structure capable of maintaining a form by a mechanical bond, not a chemical bond. Such a polyrotaxane [C] has the effect of relaxing stress from the exterior and stress remaining inside since the cyclic molecule has high mobility.

Even other impact modifiers such as a rubbery polymer can improve the impact strength of the molded article. To disperse the rubbery polymer by suppressing coarsening by a physical technique such as a twin-screw kneader, a large shear force is commonly required. Therefore, when kneading is performed using a common twin-screw kneader, a phase structure tends to cause coarsening, so that conductive networks generated when the carbon fibers [B] come into contact each other are suppressed, thus remarkably degrading the conductivity of the molded article. Meanwhile, since the polyrotaxane [C] is easily localized in the vicinity of the carbon fibers as mentioned above, the carbon fibers [B] easily come into contact with each other via the polyrotaxane [C]. Therefore, the distance between the single fibers in the conductive network formed by the carbon fibers [B] decreases, thus making it possible to exhibit more excellent conductivity.

The linear molecule is not particularly limited as long as it is a molecule which passes through the opening part of the cyclic molecule, and also has a functional group capable of reacting with the blocking group. Examples of the linear molecule, which is preferably used, include polyalkylene glycols such as polyethylene glycol, polypropylene glycol and polytetramethylene glycol; hydroxyl group-terminated polyolefins such as polybutadiene diol, polyisoprene diol, polyisobutylene diol, poly(acrylonitrile-butadiene) diol, hydrogenated polybutadiene diol, polyethylene diol and polypropylene diol; polyesters such as polycaprolactone diol, polylactic acid, polyethylene adipate, polybutylene adipate, polyethylene terephthalate and polybutylene terephthalate; terminal functional polysiloxanes such as silanol-terminated polydimethylsiloxane; amino group-terminated chain polymers such as amino group-terminated polyethylene glycol, amino group-terminated polypropylene glycol and amino group-terminated polybutadiene; and polyfunctional chain polymers having three or more functional groups capable of reacting with the blocking group in one molecule. Of these linear molecules, polyethylene glycol and/or amino group-terminated polyethylene glycol is/are preferably used in view of the fact that it is easy to synthesize the polyrotaxane.

The number-average molecular weight of the linear molecule is preferably 2,000 or more, thus making it possible to further improve the rigidity. The number-average molecular weight is more preferably 10,000 or more. Meanwhile, the number-average molecular weight is preferably 100,000 or less and it is possible to improve the compatibility with the thermoplastic resin (A) and to refine a phase-separated structure, thus enabling further improvement in toughness. The number-average molecular weight of the linear molecule is more preferably 50,000 or less. The weight-average molecular weight of the linear molecule is preferably 5,000 or more, more preferably 8,000 or more, and still more preferably 10,000 or more. The weight-average molecular weight of the linear molecule is preferably 50,000 or less, and more preferably 40,000 or less. By adjusting the weight-average molecular weight of the linear molecule in the above range, in the case of producing a composite material using the thermoplastic resin [A] and the carbon fibers [B], particularly excellent sliding effect of the polyrotaxane [C] due to sliding of the cyclic molecule on the linear molecule is exerted, thus making it possible to further improve the impact strength of the molded article when localized in the carbon fibers [B]. If the weight-average molecular weight of the linear molecule is 40,000 or less, the interaction between the polyrotaxane [C] and the thermoplastic resin [A] is optimized, so that the physical properties of the fiber reinforced composite material are particularly improved. The number-average molecular weight and the weight-average molecular weight of the linear molecule mean the value in terms of polymethyl methacrylate as measured by gel permeation chromatography in which hexafluoroisopropanol is used as a solvent and Shodex HFIP-806M (two columns)+HFIP-LG are used as columns.

The blocking group is capable of linking to a terminal functional group of the linear molecule, and is not particularly limited as long as it is a sufficiently bulky group so as not to allow eliminating the cyclic molecule from the linear molecule. Examples of the blocking group, which is preferably used, include a dinitrophenyl group, a cyclodextrin group, an adamantyl group, a trityl group, a fluoresceinyl group, a pyrenyl group, an anthracenyl group, a main chain or a side chain of a polymer having a number-average molecular weight of 1,000 to 1,000,000 and the like. Two or more of these blocking groups may be used in combination.

The cyclic molecule is not particularly limited as long as the linear molecule can pass through the opening part thereof. Examples of the cyclic molecule, which is preferably used, include cyclodextrins, crown ethers, cryptands, large cyclic amines, calixarenes, cyclophanes and the like. Cyclodextrins are cyclic compounds of a plurality of glucoses linked through an α-1,4-bond. α-cyclodextrin, β-cyclodextrin and γ-cyclodextrin are more preferably used.

The polyrotaxane [C] is a polyrotaxane whose cyclic molecule is modified with a graft chain having a reactive functional group at the end. Therefore, modification of the cyclic molecule with the graft chain having a functional group makes the compatibility of the polyrotaxane [C] with the thermoplastic resin (A) and the affinity with an interface of the carbon fibers [B] satisfactory. As a result, it is possible to improve the toughness of the molded article.

Examples of the reactive functional group of the graft chain end include, but are not particularly limited to, at least one group selected from a hydroxyl group, an amino group, a carboxyl group, an acid anhydride group, a glycidyl group, an isocyanate group, an isothiocyanate group, a thiol group, an oxazoline group, a sulfonic acid group and the like.

It is preferable that the graft chain is composed of a polyester. In view of the compatibility with the thermoplastic resin (A), an aliphatic polyester is more preferable. Examples of the aliphatic polyester include polylactic acid, polyglycolic acid, poly(3-hydroxybutyrate) poly(4-hydroxybutyrate), poly(3-hydroxybutyrate/3-hydroxyvalerate), poly(ε-caprolactone) and the like. Of these, poly(ε-caprolactone) is more preferable from the viewpoint of the compatibility with the thermoplastic resin [A].

The content of the polyrotaxane [C] in the molded article of the present invention is 1 part by weight or more and 20 parts by weight or less based on 100 parts by weight of the total content of the thermoplastic resin [A], the carbon fibers [B] and the polyrotaxane [C]. If the content of the polyrotaxane [C] is less than 1 part by weight, the stress relaxation effect of the polyrotaxane [C] is hardly exerted, leading to degradation of the toughness, i.e., impact strength of the molded article. The content of the polyrotaxane [C] is preferably 1.5 part by weight or more. Meanwhile, if the content of the polyrotaxane [C] is more than 20 parts by weight, the content of the thermoplastic resin [A] relatively decreases, leading to degradation of the moldability, which is unpreferable. The content of the polyrotaxane [C] is preferably 15 parts by weight or less, and more preferably 10 parts by weight or less.

The concentration of the functional group at the graft chain end of the polyrotaxane [C] is preferably $2 \times 10^{-5}$ mol/g or more and $5 \times 10^{-4}$ mol/g or less. The adjustment of the concentration of the functional group to $2 \times 10^{-5}$ mol/g or more enables further improvement in impact strength of the molded article. The concentration of the functional group is more preferably $3 \times 10^{-5}$ mol/g or more. Meanwhile, the adjustment of the concentration of the functional group to $5 \times 10^{-4}$ mol/g or less enables suppression of aggregation due to association between functional groups of the polyrotaxane [C] and excessive chemical crosslinking with the thermoplastic resin [A], and suppression of the generation of aggregates and gel, thus enabling further improvement in toughness. The concentration of the functional group is more preferably $1 \times 10^{-4}$ mol/g or less.

The concentration of the functional group at the graft chain end of the polyrotaxane [C] can be determined by titration. For example, when the functional group of the graft chain end is a carboxyl group, the carboxyl group concentration can be determined by the following method. Using a vacuum dryer at 80° C., an absolutely dried sample is produced by drying the polyrotaxane [C] for 10 hours or more. With respect to a solution obtained by dissolving 0.2 g of the absolutely dried sample in 25 ml of benzyl alcohol, the carboxyl group concentration can be determined by titration using an ethanol solution of potassium hydroxide having a concentration of 0.02 mol/L. With respect to other functional groups, the concentration of functional group can be calculated by a known method.

By reacting a polyrotaxane whose cyclic molecule is modified with a graft chain with an introductory compound which has a desired functional group and is also capable of reacting with a graft chain end, the functional group of the graft chain end can be imparted. In this case, it is possible to adjust the concentration of the functional group at the graft chain end in a desired range by adjusting a charge ratio of the polyrotaxane whose cyclic molecule is modified with a graft chain and the introductory compound.

The weight-average molecular weight of the polyrotaxane [C] is preferably 100,000 or more, and it is possible to further improve the toughness. The weight-average molecular weight of the polyrotaxane is preferably 1,000,000 or less, and the polyrotaxane is easily localized in the carbon fibers [B], thus making it possible to further improve the impact strength of the thus obtained molded article. The weight-average molecular weight of the polyrotaxane [C] is preferably 700,000 or less, more preferably 500,000 or less, and still more preferably 400,000 or less. The weight-average molecular weight means the value in terms of polymethyl methacrylate as measured by gel permeation chromatography in which hexafluoroisopropanol is used as a solvent and Shodex HFIP-806M (two columns)+HFIP-LG are used as columns.

The molded article of the present invention may include, in addition to the components [A] to [C], other components as long as the object of the present invention is not impaired. Examples of other components include a resin [E] having a melt viscosity at 200° C. lower than that of the thermoplastic resin [A], a phosphorus-based flame retardant [F], a heat conductive filler [H], a carbon black [I] and the like. Including the resin [E] enables an improvement in dispersibility of the carbon fibers [B]. Including the phosphorus-based flame retardant [F] enables an improvement in flame retardancy of the molded article. Including the heat conductive filler [H] enables an improvement in thermal conductivity of the molded article. Including the carbon black [I] enables further improvement in conductivity of the molded article.

It is preferable that the resin [E] has a melt viscosity at 200° C. lower than that of the thermoplastic resin [A]. Including the resin [E] enables further improvement in dispersibility of the carbon fibers [B] when the molding material mentioned below is produced and the molded article is molded using the molding material, leading to further improvement in fluidity during molding. This makes it possible to further improve the impact strength of the molded article.

The melt viscosity at 200° C. of the resin [E] is preferably 0.01 to 10 Pa·s. If the melt viscosity at 200° C. is 0.01 Pa·s or more, it is possible to further suppress the breakage starting from the resin [E], thus making it possible to further improve the impact strength of the molded article. The melt viscosity is more preferably 0.05 Pa·s or more, and still more preferably 0.1 Pa·s or more. Meanwhile, if the melt viscosity at 200° C. of the resin [E] is 10 Pa·s or less, it is possible to further improve the dispersibility of the carbon fibers [B] in the thus obtained molded article. The melt viscosity is more preferably 5 Pa·s or less, and still more preferably 2 Pa·s or less. The melt viscosity at 200° C. of the resin [E] can be measured by a viscoelasticity meter at 0.5 Hz using a 40-mm parallel plate.

It is preferable that the resin [E] has high affinity with the thermoplastic resin [A]. By selecting the resin [E] having high affinity with the thermoplastic resin [A], the resin is efficiently compatible with the thermoplastic resin [A] in the molded article, thus enabling further improvement in dispersibility of the carbon fibers [B].

The content of the resin [E] is preferably 0.1 to 12 parts by weight based on 100 parts by weight of the total content of the components [A] to [C]. If the content of the resin [E] is 0.1 part by weight or more, it is possible to obtain high fiber dispersibility in the molded article. The content of the resin [E] is more preferably 2 parts by weight or more. Meanwhile, if the content of the resin [E] is 12 parts by weight or less, it is possible to suppress degradation of the mechanical properties of the molded article. The content of the resin [E] is preferably 10 parts by weight or less.

The resin [E] is preferably at least one selected from the group consisting of terpene resins, epoxy resins, phenol resins and cyclic polyphenylene sulfides.

The resin [E] is appropriately selected according to the combination with the thermoplastic resin [A] as a matrix resin. For example, when the molding temperature of the thermoplastic resin [A] is in a range of 150 to 270° C., terpene resins are preferably used as the resin [E]. When the molding temperature of the thermoplastic resin [A] is in a range of 270 to 320° C., epoxy resins are preferably used as the resin [E]. Specifically, when the thermoplastic resin [A] is a polypropylene resin, the resin [E] is preferably the terpene resin. When the thermoplastic resin [A] is a polycarbonate resin or a polyphenylene sulfide resin, the resin [E] is preferably the epoxy resin. When the thermoplastic resin [A] is a polyamide resin, the resin [E] is preferably the terpene phenol resin.

The molded article of the present invention can be obtained by using the molding material mentioned below. In the production of the molding material, a roving of carbon fibers [B] is prepared first, as will be mentioned below. The roving of the carbon fibers [B] can be impregnated with the polyrotaxane [C] and the molten resin [E], and also the roving of the carbon fibers [B] can be impregnated with the molten resin [E]. In the case of supplying the resin [E], the melting temperature (temperature in a melting bath) is preferably 100 to 300° C. Thus, in the present invention, attention was paid to the melt viscosity of the resin [E] at 200° C. as an indicator of the impregnation properties of the roving of the carbon fibers [B] with the resin [E]. If the melt viscosity at 200° C. is in the above preferable range, the carbon fibers [B] are excellent in impregnability in the preferable melting temperature range, so that the dispersibility of the carbon fibers [B] is further improved, thus enabling further improvement in impact strength of the molded article.

The rate of change in melt viscosity of the resin [E] at 200° C. after heating for 2 hours is preferably 2% or less. In the case of supplying the resin [E] to the carbon fibers [B], the melting temperature (temperature in a melting bath) is preferably 100 to 300° C. Then, by adjusting the rate of change in melt viscosity to 2% or less, non-uniform adhesion can be suppressed even when the carbon fibers [B] are impregnated with the resin [E] over a long time, thus making it possible to secure steady production of the fiber bundle. The rate of change in melt viscosity is more preferably 1.5% or less, and still more preferably 1.3% or less.

The rate of change in melt viscosity of the resin [E] can be measured by the following method. First, the melt viscosity is measured by a viscoelasticity meter at 0.5 Hz using a 40-mm parallel plate. Subsequently, the resin [E] is left to stand for 2 hours in a hot-air drier at 200° C., and then the melt viscosity at 200° C. is measured in the same manner as mentioned above and the rate of change in melt viscosity is calculated by the following formula.

(Rate of change in melt viscosity [%])={|(melt viscosity at 200° C. after heating at 200° C. for 2 hours)−(melt viscosity at 200° C. before heating at 200° C. for 2 hours)|/(melt viscosity at 200° C. before heating at 200° C. for 2 hours)}×100

In the present invention, the epoxy resin, which is preferably used as the resin [E], refers to a compound having two or more epoxy groups in which the compound includes substantially no curing agent and does not undergo curing due to so-called three-dimensional cross-linking even under heating. The compound having a glycidyl group is preferable since it facilitates interaction with the carbon fibers [B] and impregnation. It is also possible to further improve the dispersibility of the carbon fibers [B] during molding.

Examples of the compound having a glycidyl group include glycidyl ether-type epoxy resins, glycidyl ester-type epoxy resins, glycidyl amine-type epoxy resins and alicyclic epoxy resins. Two or more of these compounds may be used in combination. Of these compounds, glycidyl ether-type epoxy resins are preferable because of good balance between the viscosity and the heat resistance thereof, and bisphenol A-type epoxy resins or bisphenol F-type epoxy resins are more preferable.

The number-average molecular weight of the epoxy resin, which is used as the resin [E], is preferably 200 to 5,000. If the number-average molecular weight of the epoxy resin is 200 or more, it is possible to further improve the mechanical properties of the molded article. The number-average molecular weight is more preferably 800 or more, and still more preferably 1,000 or more. Meanwhile, if the number-average molecular weight of the epoxy resin is 5,000 or less, the impregnation into the carbon fibers [B] is excellent, thus enabling further improvement in dispersibility of the carbon fibers [B]. The number-average molecular weight is more preferably 4,000 or less, and still more preferably 3,000 or less. The number-average molecular weight of the epoxy resin can be determined by using gel permeation chromatography (GPC).

Example of the terpene resin include polymers or copolymers produced by polymerizing a terpene monomer alone in an organic solvent in the presence of a Friedel-Crafts-type catalyst, or optionally copolymerizing with an aromatic monomer.

Examples of the terpene monomer include α-pinene, β-pinene, dipentene, d-limonene, myrcene, alloocimene, ocimene, α-phellandrene, α-terpinene, γ-terpinene, terpinolene, 1,8-cineol, 1,4-cineol, α-terpineol, β-terpineol, γ-terpineol, sabinene, para-menthadiene compounds and careen compounds. Examples of the aromatic monomer include styrene and α-methylstyrene.

Of these, α-pinene, β-pinene, dipentene and d-limonene are preferable because of having excellent compatibility with the thermoplastic resin [A], and homopolymers of these terpene monomers are more preferable. Hydrogenated terpene resins obtained by hydrogenation of these terpene resins are preferable because of having excellent compatibility with the thermoplastic resin [A], particularly a polypropylene resin.

The glass transition temperature of the terpene resin is not particularly limited thereto and is preferably 30 to 100° C. The glass transition temperature of 30° C. or higher ensures excellent handling properties of the resin [E] during molding. The glass transition temperature of 100° C. or lower makes it possible to moderately suppress the fluidity of the resin [E] during molding, leading to improved moldability.

The number-average molecular weight of the terpene resin is preferably 200 to 5,000. If the number-average molecular weight is 200 or more, it is possible to further improve the bending strength and tensile strength of the molded article. Meanwhile, if the number-average molecular weight is 5,000 or less, the terpene resin has an adequately low viscosity, and thus exhibits excellent impregnation properties, thus enabling further improvement in dispersibility of the carbon fibers [B] in the molded article. The number-average molecular weight of the terpene resin can be determined by using gel permeation chromatography (GPC).

The terpene phenol resin is obtained by reacting a terpene monomer with a phenol using a catalyst. It is possible to preferably use phenols having one to three groups of alkyl groups, halogen atoms and/or hydroxyl groups on its benzene ring. Specific examples thereof include cresol, xylenol, ethylphenol, butylphenol, t-butylphenol, nonylphenol, 3,4, 5-trimethylphenol, chlorophenol, bromophenol, chlorocresol, hydroquinone, resorcinol and orcinol. Two or more of these phenols may be used in combination. Of these, compounds selected from phenol and cresol are preferable.

The number-average molecular weight of the terpene phenol resin is preferably 200 to 5,000. If the number-average molecular weight is 200 or more, it is possible to further improve the bending strength and the tensile strength of the molded article. Meanwhile, if the number-average molecular weight is 5,000 or less, the terpene phenol resin has adequately low viscosity, and thus exhibits excellent impregnation properties, leading to further improvement in dispersibility of the carbon fibers [B] in the molded article. The number-average molecular weight of the terpene phenol resin can be determined by using gel permeation chromatography (GPC).

It is preferable to include the phosphorus-based flame retardant [F] in the molded article of the present invention because the flame retardancy is improved. The phosphorus-based flame retardant [F] forms a dense char on the surface of the molded article due to the dehydration carbonization promoting action, blocks heat and oxygen and prevents flame propagation, thus exhibiting flame retardancy.

Examples of the phosphorus-based flame retardant [F] include phosphate ester-based compounds such as triphenyl phosphate, tricresyl phosphate, trimethyl phosphate, triethyl phosphate, cresyl diphenyl phosphate, xylenyl diphenyl phosphate, 2-ethylhexyl diphenyl phosphate, and other aromatic phosphate ester, halogen-containing phosphate compounds such as trisdichloropropyl phosphate, trischloroethyl phosphate and trischloropropyl phosphate; condensed phosphate ester compounds, polyphosphates, red phosphorus-based compounds and the like. Two or more of these flame retardants may be used alone or in combination. Of these, condensed phosphate ester compounds are preferable in view of the balance between the heat resistance and the flame retardancy.

The content of the phosphorus-based flame retardant [F] is preferably 1 to 15 parts by weight based on 100 parts by weight of the total content of the components [A] to [C]. If the content is 1 part by weight or more, high flame retardancy can be obtained when the molding material is molded. The content is preferably 2 parts by weight or more. Meanwhile, if the content is 15 parts by weight or less, the mechanical properties are improved. The content is preferably 10 parts by weight or less.

As the heat conductive filler [H], a filler having thermal conductivity other than the carbon fibers [B] is selected. Examples of the shape of the filler include non-fibrous shapes such as plate shape, scale shape, granular shape, irregular shape and a crushed shape. Examples of the filler include mica, talc, kaolin, silica, calcium carbonate, glass beads, glass flakes, glass microballoons, clay, molybdenum disulfide, wollastonite, calcium polyphosphate, graphite, metal powder, metal flakes, metal ribbons, metal oxides (alumina, zinc oxide, titanium oxide, etc.), carbon powders, graphite, carbon flakes, scaly carbon, carbon nanotubes and the like. Two or more of these heat conductive fillers may be used in combination. Specific examples of the metal constituting the metal powder, the metal flakes and the metal ribbon include silver, nickel, copper, zinc, aluminum, stainless steel, iron, brass, chromium, tin and the like.

The content of the heat conductive filler [H] is preferably 1 to 40 parts by weight based on 100 parts by weight of the total content of the components [A] to [C]. If the content is 1 part by weight or more, high thermal conductivity can be obtained when the molding material is molded. The content is more preferably 10 parts by weight or more. Meanwhile, if the content is 40 parts by weight or less, the mechanical properties are improved. The content is more preferably 30 parts by weight or less.

The molded article of the present invention may include carbon black [I] as long as the object of the present invention is not impaired. When carbon black [I] is included, the conductivity is further improved. The higher the conductivity, the higher the properties of reflecting electromagnetic waves, thus improving the electromagnetic wave shielding property.

Examples of the carbon black [I] include furnace black, acetylene black, thermal black, channel black and Ketjen black. Two or more of these carbon blacks may be included.

The content of the carbon black [I] is preferably 0.1 part by weight or more and 15 parts by weight or less based on 100 parts by weight of the total content of the components [A] to [C]. If the content is 0.1 part by weight or more, high conductivity and electromagnetic wave shielding property can be obtained. If the content is 15 parts by weight or less, the occurrence of aggregation due to an increase in viscosity of the resin composition is suppressed and the deterioration of fluidity is suppressed, thus improving the appearance quality and the impact strength. The content is more preferably 0.5 to 10 parts by weight, and still more preferably 1 to 7 parts by weight.

The fiber reinforced thermoplastic resin molding material of the present invention (hereinafter sometimes referred to as "molding material") suitable for obtaining the molded article of the present invention will be described in detail below. In the present invention, the "molding material" means a raw material used when molding a molded article by injection molding or the like.

The molding material of the present invention is a molding material including a thermoplastic resin [A], carbon fibers [B] and a polyrotaxane [C], the thermoplastic resin [A], the carbon fibers [B] and the polyrotaxane [C] being included in amounts of 40 to 98 parts by weight (40 parts by weight or more and 98 parts by weight of less), 1 to 40 parts by weight (1 part by weight or more and 40 parts by weight or less) and 1 to 20 parts by weight (1 part by weight or more and 20 parts by weight or less), respectively, based on 100 parts by weight of the total content of the thermoplastic resin [A], the carbon fibers [B] and the polyrotaxane [C].

In the molding material of the present invention, if the content of the carbon fibers [B] is less than 1 part by weight, the mechanical properties of the obtained molded article, particularly the bending strength and the impact strength are degraded. The content of the carbon fibers [B] is preferably 5 parts by weight or more, and more preferably 7 parts by weight or more. If the content of the carbon fibers [B] is more than 40 parts by weight, the dispersibility of the carbon fibers [B] in the molded article is often degraded, leading to degradation of the mechanical properties, particularly the impact strength of the molded article. The content of carbon fibers [B] is preferably 35 parts by weight or less.

The content of the polyrotaxane [C] in the molding material of the present invention is preferably 1 part by weight or more and 20 parts by weight or more based on 100 parts by weight of the total content of the thermoplastic resin [A], the carbon fibers [B] and the polyrotaxane [C]. If the content of the polyrotaxane [C] is less than 1 part by weight, the stress relaxation effect of the polyrotaxane [C] is hardly exerted, leading to degradation of the toughness, i.e., impact strength of the molded article. The content of the polyrotaxane [C] is preferably 1.5 parts by weight or more. Meanwhile, if the content of the polyrotaxane [C] is more than 20 parts by weight, the content of the thermoplastic resin [A] relatively decreases, failing to make a fiber reinforced thermoplastic resin molded article, i.e., leading to degradation of the moldability, which is unpreferable. Moldability can be maintained by adjusting the content of polyrotaxane [C] to 20 parts by weight or less. The content of the polyrotaxane [C] is preferably 15 parts by weight or less, and more preferably 10 parts by weight or less.

Moreover, the ratio ([C]/[B]) of the content of the polyrotaxane [C] to that of the carbon fibers [B] is preferably less than 0.04 or more and 0.5 or less. By adjusting the ratio in above range, the stress relaxation effect of the polyrotaxane [C] on the carbon fibers [B] is easily exerted, thus further improving the impact strength and the drop-weight impact absorption energy of the molded article. The ratio [C]/[B] is preferably 0.05 or more, more preferably 0.1 or more, and still more preferably 0.15 or more. The ratio [C]/[B] is preferably 0.45 or less, more preferably 0.4 or less, and still more preferably 0.25 or less.

The molding material of the present invention includes two aspects.

In the first aspect, the molding material has a core-sheath structure, the core portion includes a polyrotaxane [C] and carbon fibers [B] and the core portion is in a state where each single fiber of the carbon fibers [B] is dispersed in the rotaxane [C], and the sheath portion includes a thermoplastic resin [A], and the length of the carbon fibers [B] and the length of the fiber reinforced thermoplastic resin molding material are substantially the same.

In the second aspect, the molding material has a core-sheath structure, the core portion includes carbon fibers [B], the sheath portion includes a thermoplastic resin [A] and a polyrotaxane [C], and the length of the carbon fibers [B] and the length of the fiber reinforced thermoplastic resin molding material are substantially the same.

The respective aspects will be described below.

The molding material of the first aspect has a structure in which a fiber bundle [G] including a polyrotaxane [C] and carbon fibers [B] is coated with a thermoplastic resin [A] or a resin composition including the thermoplastic resin [A]. Here, the "coated structure" refers to a structure in which the thermoplastic resin [A] is disposed on a surface of the fiber bundle [G] and both are bonded. In the vicinity of the boundary between the fiber bundle [G] and the thermoplastic resin [A], the thermoplastic resin [A] may partially enter a part of the fiber bundle [G]. That is, the carbon fibers [B] constituting the fiber bundle [G] may be impregnated with the thermoplastic resin [A] near the boundary, or the thermoplastic resin [A] may be compatible with the polyrotaxane [C].

When the thermoplastic resin [A] (or the resin composition including the thermoplastic resin [A]) is bonded to a surface of the fiber bundle [G], a preferable bonding method is a method in which the molten thermoplastic resin [A] (or resin composition) is disposed so as to be in contact with the surface of the fiber bundle [G], followed by cooling and solidification. The technique thereof is not particularly limited, and specific examples thereof include a method in which the thermoplastic resin [A] is continuously disposed around the fiber bundle [G] to coat the fiber bundle using an extruder and a coating die for wire coating, and a method in which the molten thermoplastic resin [A] in a film shape is disposed from one face or both faces of the fiber bundle [G] flattened by a roll the like, using an extruder and a T die, followed by integration using a roll or the like.

Figure 2:
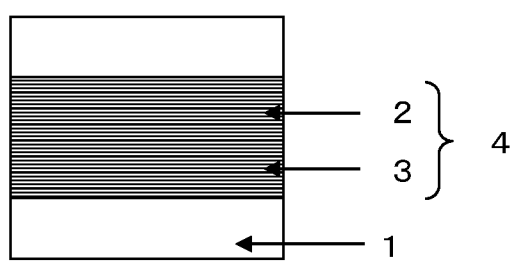
FIG. 2 is a schematic view illustrating an example of a preferable vertical cross-sectional form of a molding material of the present invention.
Figure 3:
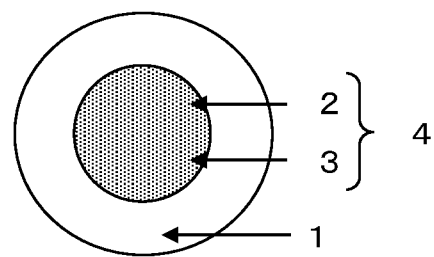
FIG. 3 is a schematic view illustrating an example of a preferable transverse cross-sectional form of a molding material of the present invention.

For example, FIG. 2 and FIG. 3 are schematic views each illustrating an example of a preferable cross-sectional form of a molding material according to a first aspect of the present invention. A reference sign 1 denotes a thermoplastic resin [A], a reference sign 2 (black part) denotes a carbon fibers [B], a reference sign 3 (white part) denotes a polyrotaxane [C], and a reference sign 4 denotes a fiber bundle [G].

The cross-section of the molding material is not limited to those illustrated in the drawings as long as the thermoplastic resin [A] is disposed outside the fiber bundle [G] so as to bond thereto.

Figure 4:
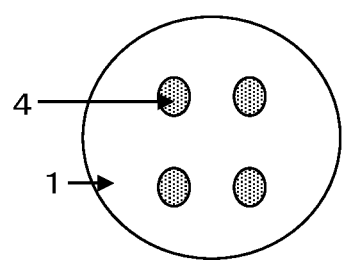
FIG. 4 is a schematic view illustrating an example of a preferable transverse cross-sectional form of a molding material of the present invention.

The cross-section of the molding material of the first aspect preferably has a structure in which the fiber bundle [G] serves as a core material and is sandwiched between the thermoplastic resin [A] in a layer form as illustrated in the transverse cross-sectional form of FIG. 2. Moreover, a structure is preferably such that the fiber bundle [G] serves as a core structure and the periphery of the fiber bundle is coated with the thermoplastic resin [A] to form a core-sheath structure as illustrated in the transverse cross-sectional form of FIG. 3. Moreover, a structure is preferably such that a plurality of the fiber bundles [G] are arranged to be coated with the thermoplastic resin [A] as illustrated in FIG. 4. In that case, the number of the fiber bundles [G] is preferably around 2 to 6. FIG. 1 is a schematic view illustrating an example of a transverse cross-sectional form of a fiber bundle [G] in the present invention. As illustrated in FIG. 1, the fiber bundle [G] in the present invention is in a state where each single fiber of the carbon fibers [B] is dispersed in a polyrotaxane [C]. Here, the state where each single fiber of the carbon fibers [B] is dispersed in a polyrotaxane [C] refers to a state where a polyrotaxane [C] is filled between the single fibers of the carbon fibers [B]. It can also be a state where the carbon fibers [B] are impregnated with the polyrotaxane [C]. In the present invention, the vertical cross-section means a cross-section in a plane including an axial direction, and the transverse cross-section means a cross-section in a plane orthogonal to the axial direction. Moreover, when the molding material has a columnar shape such as pellets, the axial direction means an axial center of a cylinder.

The length of the carbon fibers [B] and the length of the molding material are substantially the same. This is illustrated, for example, in the aspect of FIG. 3. In the molding material illustrated in FIG. 3, each single fiber of the carbon fibers [B] is arranged substantially parallel to the axial direction (same direction) of the molding material, and the length of the carbon fibers [B] and the length of the molding material are substantially the same. In FIG. 3, black points denote carbon fibers [B], and a white part denotes a polyrotaxane [C].

"Arranged substantially parallel" as used herein means a state where the axis of the long axis of the carbon fibers [B] and the axis of the long axis of the molding material are oriented in the same direction. Specifically, an angle formed by the axis of the long axis of the carbon fibers [B] and the axis of the long axis of the molding material is preferably 20° or less, more preferably 10° or less, and still more preferably 5° or less. Moreover, "the fact that the carbon fibers [B] have the "length which is substantially the same" as that of the molding material" means that the carbon fibers [B] are not cut intentionally inside the molding material and that the carbon fibers [B] significantly shorter than the entire length of the molding material are not substantially included. Although not particularly limited, the content of the carbon fibers [B] having a length of 50% or less of the entire length of the molding material is preferably 30% by mass or less, and more preferably 20% by mass or less of the whole carbon fibers [B]. When the carbon fibers [B] have the length which is substantially the same as that of the molding material, it is possible to increase the carbon fiber length in the thus obtained molded article, thus enabling further improvement in impact strength of the molded article. Each length of the carbon fibers [B] and the molding material is preferably 18 mm or less and 3 mm or more, and more preferably 15 mm or less and 5 mm or more. It is preferable that the molding material maintains a cross-sectional shape which is substantially the same in a longitudinal direction, and is continuous.

The method for producing a molding material according to a first aspect of the present invention will be described below.

In the present invention, examples of the method for impregnating carbon fibers [B] with a polyrotaxane [C] to obtain a fiber bundle [G] include, but are not particularly limited, to a method comprising a step (I) of bringing a polyrotaxane [C] into contact with carbon fibers [B] in a molten state at 100 to 300° C., thereby adhering the polyrotaxane [C] to the carbon fibers [B], and a step (II) of heating the carbon fibers [B] with the polyrotaxane [C] adhered thereon, thereby impregnating the carbon fibers [B] with the polyrotaxane [C], thus obtaining a fiber bundle [G]. The polyrotaxane [C] and the resin [E] may also be used in combination. In that case, the resin [E] is adhered to the carbon fibers [B] and the carbon fibers [B] are impregnated with the resin [E] in the same manner as the polyrotaxane [C].

In the step (I), the method of supplying the polyrotaxane [C] and then adhering the polyrotaxane [C] to the carbon fibers [B] is not particularly limited. For example, it is possible to use any method which is used to apply an oil agent, a sizing agent, a matrix resin or the like to the carbon fibers [B]. Of these methods, dipping or coating is preferably used.

The term "dipping" as used herein refers to a method in which the polyrotaxane [C] is supplied to a melting bath and the carbon fibers [B] are allowed to pass through the melting bath using a pump. It is possible to certainly adhere the polyrotaxane [C] to the carbon fibers [B] by immersing the carbon fibers [B] in polyrotaxane [C] in the melting bath.

The term "coating" as used herein refers to a method in which the polyrotaxane [C] is applied to the carbon fibers [B] using coating means such as a reverse roll, a normally rotating roll, a kiss roll, a spray and a curtain. In a reverse roll, a normally rotating roll and a kiss roll, coating refers to a method in which the polyrotaxane [C] melted with a pump is supplied onto a roll and then the molten polyrotaxane [C] is applied to the carbon fibers [B]. In a reverse roll, coating refers to a method in which two rolls are provided with carbon fibers [B] interposed between the rolls, and the two rolls rotate in directions opposite to each other in the contact portion and the molten polyrotaxane [C] is applied onto the rolls. In a normally rotating roll, coating refers to a method in which two rolls are provided with carbon fibers [B] interposed between the rolls, and the two rolls rotate in the same direction in the contact portion and the molten polyrotaxane [C] is applied onto the rolls.

In a kiss roll, coating refers to a method in which the polyrotaxane [C] is adhered only when the carbon fibers [B] are in contact with a roll. Therefore, the kiss roll is preferably used when the polyrotaxane [C] has relatively low viscosity. Even when using any one of these roll methods, it is possible to adhere a predetermined amount of the polyrotaxane [C] per unit fiber length by applying a predetermined amount of the heat-melted polyrotaxane [C] onto a roll and running the roll while allowing the roll to be in contact with the carbon fibers [B]. A spray refers to a method utilizing the principle of atomization, in which the molten polyrotaxane [C] is atomized in the form of mists, which are sprayed over the carbon fibers [B]. A curtain refers to a method in which the molten polyrotaxane [C] is dropped naturally through small holes or over-flowed from a melting vessel, thereby applying the polyrotaxane [C] to the carbon fibers [B]. In these methods, the amount to be applied can be easily controlled, thus makes it possible to minimize the loss of the polyrotaxane [C].

The melting temperature (i.e., the temperature in the melting bath) to be employed in the supply of the polyrotaxane [C] is preferably 100 to 300° C. If the melting temperature is 100° C. or higher, the viscosity of the polyrotaxane [C] can be maintained at a proper value, thus making it possible to suppress uneven adhesion of the polyrotaxane [C]. The melting temperature is more preferably 150° C. or higher. Meanwhile, if the melting temperature is 300° C. or lower, the thermal decomposition of the polyrotaxane [C] can be suppressed even if the production is carried out over a long period of time. The melting temperature is more preferably 250° C. or lower. It is possible to stably adhere the polyrotaxane [C] to the carbon fibers [B] by bringing the polyrotaxane [C] into contact with the carbon fibers [B] in a molten state at 100 to 300° C.

Next, a description will be made of the step of heating the carbon fibers [B] with the polyrotaxane [C] adhered thereon, which is obtained in the step (I), thereby impregnating the carbon fibers [B] with the polyrotaxane [C] (step (II)). Specifically, the step (II) is a step of impregnating the polyrotaxane [C] into the inside of the carbon fibers [B] by operations such as application of tension to the carbon fibers [B] with the polyrotaxane [C] adhered thereon using a roll or a bar, repetition of broadening and bundling of the carbon fibers [B] with the polyrotaxane [C] adhered thereon, and application of pressure or vibrations to the carbon fibers [B] with the polyrotaxane [C] adhered thereon, at a temperature at which the polyrotaxane [C] is melted. It is possible to exemplify, as more specific example of the method, a method in which broadening or the like is carried out while passing the carbon fibers [B] through a plurality of heated rolls or bars to be in contact with a surface of the plurality of rolls or bars. Of these, a method using a squeeze tip, a squeeze roll, a roll press or a double-belt press is preferably employed. The squeeze tip as used herein refers to a tip of which diameter decreases toward the running direction. Use of the squeeze tip can scrape the excessively adhered polyrotaxane [C] while bundling the carbon fibers [B] and, at the same time, can promote the impregnation of the polyrotaxane [C] while bundling the carbon fibers [B]. The squeeze roll as used herein refers to a roller which, when tension is applied to the carbon fibers [B] by the roller, can scrape the excessively adhered polyrotaxane [C] and, at the same time, can promote the impregnation of the carbon fibers [B] with the polyrotaxane [C]. The roll press as used herein refers to a device which continuously remove the air inside the carbon fibers [B] by the action of a pressure applied between two rolls and, at the same time, promotes impregnation of the carbon fibers [B] with the polyrotaxane [C]. The double-belt press as used herein refers to a device which presses the carbon fibers [B] from upward and downward through a belt, thereby promoting the impregnation of the carbon fibers [B] with the polyrotaxane [C].

In the step (II), it is preferable that the carbon fibers [B] are impregnated with the polyrotaxane [C] in the amount of 80 to 100% by weight based on the amount of the polyrotaxane [C] supplied. The impregnation amount directly affects the yield. Therefore, a larger impregnation amount compared with the supplied amount is preferable from the viewpoint of economic efficiency and productivity. The impregnation amount is more preferably 85 to 100% by weight, and still more preferably 90 to 100% by weight. If the impregnation amount is 80% by weight or more, it is possible to suppress the generation of a volatile component due to the polyrotaxane [C] during the step (II) and to suppress the formation of voids in the fiber bundle [G], in addition to the viewpoint of economic efficiency.

In the step (II), it is preferable that the highest temperature of the polyrotaxane [C] is 150 to 400° C. If the highest temperature is 150° C. or higher, even when the resin [E] is included, the resin [E] can be melted sufficiently and can be penetrated more effectively. The highest temperature is more preferably 180° C. or higher, and still more preferably 200° C. or higher. Meanwhile, when the highest temperature is 400° C. or lower, it is possible to suppress the occurrence of an undesirable side reaction, such as a reaction of decomposition of the polyrotaxane [C]. The highest temperature is more preferably 380° C. or lower, and still more preferably 350° C. or lower.

The heating method in the step (II) is not particularly limited, and specific examples thereof include a method in which a heated chamber is used, and a method in which heating and pressing are performed simultaneously using a hot roller.

From the viewpoint of suppressing the occurrence of an undesirable side reaction such as a reaction of crosslinking of the polyrotaxane [C] and a reaction of decomposition of the polyrotaxane [C], heating is preferably performed in a non-oxidative atmosphere. The term "non-oxidative atmosphere" as used herein refers to an atmosphere where the oxygen concentration is 5% by volume or less, preferably an atmosphere where the oxygen concentration is 2% by volume or less, and still more preferably an oxygen-free atmosphere, i.e., an atmosphere of inert gas such as nitrogen, helium or argon. Particularly from the viewpoint of economic efficiency and easiness of handling, a nitrogen atmosphere is preferable.

Prior to the steps (I) and (II), the bundle of the carbon fibers [B] may be opened previously. The term "opening" as used herein refers to an operation of opening a bundled carbon fiber bundle, and it is possible to expect the effect of further improving the impregnation of the polyrotaxane [C]. This opening operation enables the reduction of the thickness of the carbon fiber bundle. It is preferable that the opening ratio (=$(b_2/a_2)/(b_1/a_1)$) is adjusted to 2.0 or more, and more preferably 2.5 or more, where $b_1$ (mm) and $a_1$ (μm) respectively denote the width and the thickness of a carbon fiber bundle before the opening operation and $b_2$ (mm) and $a_2$ (μm) respectively denote the width and the thickness of the carbon fiber bundle after the opening operation.

The method of opening the carbon fiber bundle is not particularly limited, and it is possible to employ a method in which the carbon fiber bundle is allowed to pass through a concave-convex roll alternately, a method in which a drum-shaped roll is used, a method in which a varied tension is applied to the carbon fiber bundle by the action of axis-direction vibrations, a method in which the tension of the carbon fiber bundle is varied by two vertically reciprocating friction bodies, and a method in which air is blown against the carbon fiber bundle.

The molding material of the first aspect can be obtained by coating the fiber bundle [G] with the thermoplastic resin [A] or a resin composition containing the thermoplastic resin [A].

The molding material of the second embodiment has a structure in which the outside of a fiber bundle [J] including the carbon fibers [B] is coated with a resin composition including a thermoplastic resin [A] and a polyrotaxane [C]. Here, the "covered structure" refers to a structure in which the thermoplastic resin composition including the thermoplastic resin [A] and the polyrotaxane [C] is disposed on a surface of the fiber bundle [J], and both are bonded to each other. The thermoplastic resin composition may partially enter a part of the fiber bundle [J] at the boundary between the fiber bundle [J] and the thermoplastic resin composition. That is, the thermoplastic resin composition may be in a state where the carbon fibers [B] constituting the fiber bundle [J] are impregnated with the thermoplastic resin composition near the boundary.

The carbon fibers [B] may be impregnated with the resin [E] to form the fiber bundle [J]. By impregnating the carbon fibers [B] with the resin [E], the resin [E] plays a role of a so-called impregnation auxiliary agent or dispersion auxiliary agent which helps the carbon fibers [B] to be dispersed in the thermoplastic resin composition including the thermoplastic resin [A].

Examples of the method of obtaining the fiber bundle [J] in which the carbon fibers [B] with the resin [E] include, but are not particularly limited, to a method comprising a step (I) of bringing the resin [E] into contact with carbon fibers [B] in a molten state at 100 to 300° C., thereby adhering the resin [E] to the carbon fibers [B], and a step (II) of heating the carbon fibers [B] with the resin [E] adhered thereon, thereby impregnating the carbon fibers [B] with the resin [E], thus obtaining a fiber bundle [J]. It is possible to use, as the step (I) and the step (II), the same method as in the production of the molding material of the first aspect. In that case, the polyrotaxane [C] is replaced by the resin [E].

The molding material of the second aspect can be obtained by coating the fiber bundle [J] with a resin composition including a thermoplastic resin [A] and a polyrotaxane [C]. The method for coating the fiber bundle [J] with the resin composition including the thermoplastic resin [A] and the polyrotaxane [C] is the same as the method for coating the fiber bundle [G] with the thermoplastic resin [A] or a composition including the thermoplastic resin [A] in the first aspect.

In the molding material of the second aspect, the length of the carbon fibers [B] and the length of the molding material are substantially the same. Here, the definition of "the lengths are substantially the same" is the same as that of the molding material of the first aspect. Like the molding material of the first aspect, in the molding material of the second aspect, the length of the carbon fibers [B] and the length of the molding material are preferably 18 mm or less and 3 mm or more, and more preferably 15 mm or less and 5 mm or more. It is preferable that the molding material is continuous while maintaining substantially the same cross-sectional shape in the longitudinal direction.

It is not absolutely necessary that the molding material of the present invention is composed of a single molding material, and may be a combination of two or more of molding materials. Examples of the method of combining two or more molding materials include a method of dry blending two or more molding materials. Specific examples thereof include a method of dry blending (i) a molding material in which a thermoplastic resin [A] is coated on the outside of a fiber bundle [G] obtained by impregnating carbon fibers [B] with a polyrotaxane [C] (blend component 1), and (ii) a molding material made of a resin composition obtained by melt-kneading a thermoplastic resin [A] and a polyrotaxane [C] (blend component 2) so that the content of each component falls in the above range.

Here, the mixing ratio of a blend component 1 to a blend component 2 (blend component 1/blend component 2) is preferably 75/25 to 25/75 (weight ratio), more preferably 70/30 to 30/70, and still more preferably 67/33 to 33/67. In such a mixing ratio, the composition of the blend component 1 and that of the blend component 2 are preferably adjusted so that the content of each component falls in the preferable range.

The molding material of the present invention may include, in addition to the components [A] to [C], other components in a range that does not impair the object of the present invention. Examples of other components include a resin [E] having a melt viscosity at 200° C. lower than that of the thermoplastic resin [A], a phosphorus-based flame retardant [F], a heat conductive filler [H], a carbon black [I] and the like. It is possible to use, as the components [E] to [I], those exemplified as other components in the molded article of the present invention.

It is possible to use, as the resin [E], those exemplified as the constituent components of the molded article of the present invention. Of these, resins selected from bisphenol A type epoxy resins, terpene phenol resins and hydrogenated terpene resins are preferable. The content of the resin [E] is preferably 0.1 to 12 parts by weight based on 100 parts by weight of the total content of the components [A] to [C]. If the content is 0.1 part by weight or more, high fiber dispersibility can be obtained when the molding material is molded. The content is preferably 2 parts by weight or more. Meanwhile, if the content is 12 parts by weight or less, degradation of mechanical properties can be suppressed. The content is preferably 10 parts by weight or less.

It is possible to use, as the phosphorus-based flame retardant [F], those exemplified as the constituent components of the molded article of the present invention. Of these, the condensed phosphate ester compound is preferable in view of the balance between the heat resistance and the flame retardancy. The content of the phosphorus-based flame retardant is preferably 1 to 15 parts by weight based on 100 parts by weight of the total content of the components [A] to [C]. If the content is 1 part by weight or more, high flame retardancy can be obtained when the molding material is molded. The content is preferably 2 parts by weight or more. By adjusting the content to 15 parts by weight or less, the mechanical properties are improved. The content is preferably 10 parts by weight or less.

Examples of the heat conductive filler [H] include heat conductive fillers other than the carbon fibers [B], and it is possible to use the heat conductive filler [H] exemplified in the molded article of the present invention.

The content of the heat conductive filler [H] is preferably 1 to 40 parts by weight based on 100 parts by weight of the total content of the components [A] to [C]. If the content is 1 part by weight or more, high thermal conductivity can be obtained when the molding material is molded. The content is preferably 10 parts by weight or more. Meanwhile, if the content is 40 parts by weight or less, the mechanical properties are improved. The content is preferably 30 parts by weight or less.

Examples of the carbon black [I] include furnace black, acetylene black, thermal black, channel black, Ketjen black and the like. Two or more of these carbon blacks may be included. When the carbon black [I] is blended, the conductivity is further improved. The higher the conductivity, the higher the property of reflecting electromagnetic waves, and thus the electromagnetic wave shielding property is improved.

The content of the carbon black [I] is preferably 0.1 to 15 parts by weight based on 100 parts by weight of the total content of the above components [A] to [C]. If the content is 0.1 part by weight or more, high conductivity and electromagnetic wave shielding property can be obtained when the molding material is molded. The content is more preferably 0.5 part by weight or more, and still more preferably 1 part by weight or more. Meanwhile, if the content is 15 parts by weight or less, the mechanical properties, particularly the impact strength is improved. The content is more preferably 10 parts by weight or less, further preferably 7 parts by weight or less.

In the molding material of the present invention, the phosphorus-based flame retardant [F], the heat conductive filler [H] and the carbon black [I] may be contained in any of raw materials. They may be included in the fiber bundle [G] or [J] which is the core portion, or may be included in the thermoplastic resin [A] which is the sheath portion, or may be included in both of them. Meanwhile, the resin [E] is preferably included in the fiber bundle [G] or [J].

The resin composition including the thermoplastic resin [A] for coating the fiber bundle [G] in the molding material of the first aspect of the present invention, or the resin composition including the thermoplastic resin [A] and the polyrotaxane [C] for coating the fiber bundle [J] in the molding material of the second aspect of the present invention is preferably melt-kneaded under a resin pressure of 1.0 MPa or more. The resin pressure in the present invention means a gauge pressure as measured by a resin pressure gauge attached to a melt-kneading device. The resin pressure is not particularly limited as long as the mechanical performance permits and the pressure is 1.0 MPa or more. The resin pressure is preferably in a range of 1.0 to 10 MPa, and more preferably 1.5 to 7 MPa because of little degradation of the resin. In the second aspect, when the melt kneading is performed under the resin pressure in the above range, the polyrotaxane [C] in the thus obtained molded article becomes more compatible with the thermoplastic resin [A], so that the toughness of the molded article is improved, leading to excellent impact strength.

Examples of the method for adjusting the resin pressure during melt kneading include, but are not particularly limited to, a method in which the resin viscosity is adjusted by adjusting the melt kneading temperature, a method in which a polymer having a molecular weight enabling the desired resin pressure is selected, a method by changing the screw arrangement such as reverse full flight and introduction of a kneading block, a method in which the polymer filling rate in the barrel is adjusted, a method in which the screw rotation speed is adjusted, a method in which the resin viscosity is adjusted by mixing any additives, a method in which a supercritical state is achieved by introducing carbon dioxide gas and the like.

The molding material of the present invention can be molded into a molded article by a technique such as injection molding and press molding. From the viewpoint of handling properties of the molding material, it is preferable that the fiber bundle [G] or the fiber bundle [J] and the thermoplastic resin [A] do not undergo separation in an adhered state and keep the above-mentioned form until molding is performed. The fiber bundle [G] or the fiber bundle [J] and the thermoplastic resin [A] are quite different from each other with respect to a shape (a size, an aspect ratio), a specific gravity and a mass. Therefore, when these components undergo separation, these components are sieved during transportation of the material and handling of the material before molding and during transportation of the material in the molding step, so that variation in mechanical properties of the molded article may occur, the fluidity of the material may decrease to cause clogging in a mold, or blocking may occur during the molding step. If the molding material has a core-sheath structure as illustrated in FIG. 3, the thermoplastic resin [A] constrains the fiber bundle [G] or the fiber bundle [J], thus enabling formation of a strong complex. From the viewpoint of easiness of production and easiness of handling of the material, the molding material of the present invention preferably has the core-sheath structure.

The molding material of the present invention may have a continuous form or may be cut into a certain length as long as it maintains a cross-sectional shape which is substantially the same in a longitudinal direction. The length of the molding material is preferably in a range of 18 mm or less and 3 mm or more, and more preferably 15 mm or less and 5 mm or more. When the length of the molding material is in the above range, it is possible to sufficiently enhance the fluidity and the handling properties during molding. A long fiber pellet for injection molding can be illustrated as a particularly preferable aspect of the molding material. Here, the long fiber pellet refers to a molding material in which the length of the carbon fibers [B] is substantially the same as that of the molding material, as mentioned above. The carbon fibers [B] are preferably aligned in one direction in the axial direction of the pellet.

The molding material of the present invention can also be used even in a continuous and long form according to the molding method. For example, the continuous molding material can be wound around a mandrel while heating as a thermoplastic yarn prepreg to obtain a rolled molded article. It is also possible to prepare a unidirectional thermoplastic prepreg by arranging a plurality of the molding materials of the present invention having a continuous and long form in one direction, followed by heating and melting. Such a prepreg can be applied to the field where lightweight properties, high strength, high elastic modulus and high impact strength are required, for example, automobile members.

The molded article can be produced by molding the molding material of the present invention. Examples of the molding method include, but are not particularly limited to, molding methods having excellent productivity, such as injection molding, autoclave molding, press molding, filament winding molding and stamping molding. Two or more of these molding methods can be used in combination. Alternatively, the molding method may be applied to integral molding including insert molding and outsert molding. It is also possible to make use of reformation processing by heating or an adhesion method having excellent productivity, such as thermal fusion bonding, vibration fusion bonding or ultrasonic fusion bonding. Of these methods, a molding method using a mold is preferable. Particularly when a molding method using an injection molding machine is employed, a stable molded article can be continuously produced, which is preferable. The conditions for the injection molding are not particularly limited. For example, the conditions are preferably as follows: the injection time: 0.5 to 15 seconds, and more preferably 1 to 10 seconds; the back pressure: 0.1 to 20 MPa, more preferably 2 to 15 MPa, and still more preferably 3 to 10 MPa; the hold pressure: 1 to 150 MPa, and more preferably 5 to 100 MPa; the pressure holding time: 1 to 20 seconds, and more preferably 5 to 20 seconds; the cylinder temperature: 200 to 320° C.; and the mold temperature: 20 to 100° C. The term "cylinder temperature" as used herein refers to a temperature of a part of an injection molding machine at which the molding material is to be melted with heat, and the term "mold temperature" as used herein refers to a temperature of a mold into which the resin is to be injected to form a predetermined shape. The weight-average fiber length $[L_w]$ of the carbon fibers [B] in the molded article can be adjusted to the value falling in the above preferable range by appropriately selecting these conditions, particularly the injection time, the back pressure and the mold temperature.

Applications of the molded article according to the present invention include automobile components/members and exterior panels, for example, various modules such as instrument panels, door beams, undercovers, amp housings, pedal housings, radiator supports, spare tire covers and front ends, cylinder head covers, bearing retainers, intake manifolds and pedals; aircraft-related components/members and exterior panels, such as landing gear pods, winglets, spoilers, edges, ladders, failings and ribs; machine tools, such as monkey wrenches; components of home/office electrical appliances, such as telephones, facsimiles, VTRs, copying machines, televisions, microwave ovens, audio equipment, toiletry products, laser discs (registered tradename), refrigerators and air conditioners; and members for electric/electronic devices, such as housings for personal computers, digital cameras and mobile phones, and keyboard support bodies as members for supporting keyboards in personal computers. The molded article of the present invention has excellent impact strength and conductivity and are there preferably used as housings for personal computers, digital cameras and mobile phones of the above applications.

EXAMPLES

The present invention will be described in detail below by way of examples. However, the present invention is not limited by the examples. First, the methods for evaluating various properties will be described.

(1) Weight-Average Fiber Length of Carbon Fibers [B] in Molded Article

Each of test specimens measuring 80 mm×10 mm×4 mm thick obtained in the respective Examples and Comparative Examples was notched at a notch angle of 45° and a depth of 2 mm in accordance with ISO 2818(1994). A notched Charpy impact test was performed for the notched test specimen in accordance with ISO 179-1(2010) using a hammer at 1.0 J. The test specimen broken by this test was heated in a state of being sandwiched between glass plates on a hot stage set at 200 to 300° C., and then formed into a film. The thus obtained film including the carbon fibers [B] dispersed uniformly therein was observed using an optical microscope at a magnification of 50 to 200 times. The fiber length of randomly selected 1,000 carbon fibers [B] was measured. Since common carbon fibers were used in the respective Examples, the density and the diameter of the carbon fibers are the same, so that a weight-average fiber length ($L_w$) was calculated from the following formula.

Weight-average fiber length=$\Sigma(M_i^2 \times N_i)/\Sigma(M_i \times N_i)$ where
Mi: fiber length (mm)
Ni: Number of fibers having a fiber length of Mi (2) Fiber Dispersibility of Molded Article The number of undispersed carbon fiber bundles existing on the front and back surfaces of each of test specimens measuring 80 mm×80 mm×3 mm thick obtained in the respective Examples and Comparative Examples was visually counted. The fiber bundle of more than 1 mm square was regarded as the undispersed carbon fiber bundle. The fiber dispersibility was evaluated based on the total sum of the number of undispersed carbon fiber bundles on 50 test specimens according to the following criteria. Those rated as A and B were regarded as acceptable.
A: Less than 1 undispersed carbon fiber bundle
B: 1 or more and less than 10 undispersed carbon fiber bundles
C: 10 or more undispersed carbon fiber bundles (3) Bending Strength/Bending Elastic Modulus of Molded Article The bending strength and the bending modulus of each of ISO-type dumbbell-shaped test specimens obtained in the respective Examples and Comparative Examples was measured in accordance with ISO 178(2010), wherein the distance from a supporting point was set at 64 mm using a three-point bending test jig having an indenter radius of 5 mm and the measurement was performed under the test condition of the test speed of 2 mm/min. As a test machine, "Instron" (registered tradename) universal testing instrument 5566-model (manufactured by Instron Corporation) was used.

(4) Impact Strength of Molded Article

Each of test specimens measuring 80 mm×10 mm×4 mm thick obtained in the respective Examples and Comparative Examples was notched at a notch angle of 45° and a depth of 2 mm in accordance with ISO 2818(1994). The notched Charpy impact strength of the notched test specimen was measured in accordance with ISO 179-1(2010) using a hammer at 1.0 J. Test pieces, which have a Charpy impact strength of 70 kJ/m² or more and are not divided into two, were classified as non-break (NB).

(5) Measurement of Volume Resistivity of Molded Article

Each of ISO-type dumbbell-shaped test specimens obtained in the respective Examples and Comparative Examples was cut into pieces measuring 80 mm×10 mm×4 mm thick using a band saw, and then a cut surface was smoothened with a #400 sandpaper to obtain test specimens for measuring volume resistivity. In accordance with JIS K 6271(2008), the volume resistivity (Ω·cm) was measured by a four-terminal method using a resistance meter HIOKI3541.

(6) Measurement of Drop-Weight Impact Absorption Energy of Molded Article

For each of test specimens measuring 80 mm×80 mm×3 mm thick obtained in the respective Examples and Comparative Examples, the measurement was performed using a drop-weight impact tester IM10 (manufactured by IMATEK Corporation). Using a round-shaped tap with a round tip (φ20 mm), a drop-weight impact test was performed under the conditions of the weight mass of 15 kg, the drop-weight speed of 4.4 m/sec and the test temperature of 23° C. The measurement was performed three times, and the average was calculated as the drop-weight impact absorption energy (J) of the respective Examples and Comparative Examples.

(7) Melt Viscosity

For the thermoplastic resin [A] and the resin [E] used in the respective Examples and Comparative Examples, a rheometer ARES (manufactured by TA Instruments) was used and the melt viscosity at 200° C. was measured by a viscoelasticity meter at 0.5 Hz using a 40-mm parallel plate. The resin [E] was left to stand in a hot air dryer at 200° C. for 2 hours, and then the melt viscosity at 200° C. was measured in the same manner. The rate of change in melt viscosity was determined by the following formula.

(Rate of change in melt viscosity [%])={|(melt viscosity at 200° C. after heating at 200° C. for 2 hours)−(melt viscosity at 200° C. before heating at 200° C. for 2 hours)|/(melt viscosity at 200° C. before heating at 200° C. for 2 hours)}×100

(Reference Example 1) Production of Carbon Fibers [B-1]

Using a copolymer containing polyacrylonitrile as the main component, homogeneous carbon fibers [B-1] which had a total number of single fibers of 24,000, a single fiber diameter of 7 μm, a mass per unit length of 1.6 g/m, a specific gravity of 1.8 g/cm³, and a surface oxygen concentration ratio [O/C] of 0.12 were produced through the steps of spinning, a burning treatment and a surface oxidation treatment. The strand tensile strength and the strand tensile modulus of the carbon fibers were 4,880 MPa and 225 GPa, respectively.

The surface oxygen concentration ratio was determined using carbon fibers, which had been subjected to the surface oxidation treatment, by X-ray photoelectron spectroscopy in the following manner. First, the carbon fiber bundle was cut into pieces each having a length of 20 mm and the pieces were spread and arranged on a copper-made sample support table. The inside of the sample chamber in an X-ray photoelectron spectroscopy device was kept at 1×10⁻⁸ Torr, and then the measurement was performed using AlKα1 or AlKα2 as an X-ray source. As the value for the correction of a peak which was to be performed due to the occurrence of electrostatic charging during the measurement, the kinetic energy value (K.E.) of the main peak of $C_{1s}$ was set at 1202 eV. The $C_{1s}$ peak area was determined by drawing, as K.E., a linear base line in the range from 1,191 to 1,205 eV. The $O_{1s}$ peak area was determined by drawing, as K.E., a liner base line in the range from 947 to 959 eV. The surface oxygen concentration was calculated as an atom number ratio from the ratio of the $O_{1s}$ peak area to the $C_{1s}$ peak area using a sensitivity correction value inherent to a device. ES-200 model (manufactured by Kokusai Electric Inc.) was used as the X-ray photoelectron spectroscopy device, and the sensitivity correction value employed in this case was 1.74.

As a sizing agent, a sizing treatment solution in which polyglycerol polyglycidyl ether (epoxy equivalent: 140 g/eq) was dissolved in water at a concentration of 2% by weight was prepared. The sizing agent was applied onto the carbon fibers by an immersion method in such a manner that the amount of the sizing agent applied onto the carbon fibers became 1.0% by weight based on the total of the sizing agent and the carbon fibers, and then the resultant product was dried at 230° C. The amount of the sizing agent applied onto the carbon fibers [B-1] thus obtained was 1.0% by weight based on the total of the sizing agent and the carbon fibers.

(Reference Example 2) Production of Fiber Bundle [G]

A coating film of a solution, which was prepared by melting the polyrotaxane [C] shown in the respective Examples and Comparative Examples, by heating, was formed on a roll that was heated to an application temperature of 150° C. For the purpose of forming a coating film having a uniform thickness on a roll, a reverse roll was used. The continuous carbon fiber [B-1] bundle obtained in Reference Example 1 was allowed to pass on the roll while contacting the carbon fiber [B-1] bundle with the roll, thereby adhering the polyrotaxane [C] onto the carbon fiber [B-1] bundle. Subsequently, the carbon fiber [B-1] bundle with the polyrotaxane [C] adhered thereon was allowed to pass through five pairs of roll presses each having a diameter of 50 mm under a nitrogen atmosphere in a chamber that was heated to a impregnation temperature of 250° C. According to this procedure, the polyrotaxane [C] is impregnated into the carbon fiber bundle to produce a fiber bundle [G] with a predetermined content.

(Reference Example 3) Production of Fiber Bundle [J]

A coating film of a solution, which was prepared by melting the resin [E] shown in the respective Examples and Comparative Examples, by heating, was formed on a roll that was heated to an application temperature of 150° C. For the purpose of forming a coating film having a uniform thickness on a roll, a reverse roll was used. The continuous carbon fiber [B-1] bundle obtained in Reference Example 1 was allowed to pass on the roll while contacting the carbon fiber [B-1] bundle with the roll, thereby adhering the resin [E] onto the carbon fiber [B-1] bundle. Subsequently, the carbon fiber [B-1] bundle with the resin [E] adhered thereon was allowed to pass through five pairs of roll presses each having a diameter of 50 mm under a nitrogen atmosphere in a chamber that was heated to a impregnation temperature of 250° C. According to this procedure, the resin [E] impregnated into the carbon fiber bundle to produce a fiber bundle [J] with a predetermined content.

(Reference Example 4) Production of Thermoplastic Resin Composition

The following procedures were performed using a TEX-30α-model twin screw extruder (screw diameter: 30 mm, die diameter: 5 mm, barrel temperature: 260° C., number of revolutions of screw: 150 rpm) (manufactured by JSW). A product, which was produced by the dry-blending of a thermoplastic resin [A], a polyrotaxane [C], a phosphorus-based flame retardant [F] and a carbon black [I] shown in each of Examples and Comparative Examples at a compounding ratio shown in each of Examples and Comparative Examples, was supplied through a main hopper, and then a molten resin composition was discharged through a die port while degassing through a vacuum vent provided downstream from the main hopper. The resultant strand was cooled, and was then cut with a cutter to produce pellets of the thermoplastic resin composition.

The raw materials used in Examples and Comparative Examples are as follows.

Thermoplastic Resin [A]

[A-1] A polycarbonate resin ("Panlite" (registered trademark) L-1225L, manufactured by Teijin Chemicals Ltd.) was used. The melt viscosity at 200° C. was measured by the method mentioned in the above (7) and found to be 14,000 Pa·s.

[A-2] A pellet-blended product prepared by mixing a polypropylene resin ("Prime Polypro" (registered trademark) J137G manufactured by Prime Polymer Co., Ltd.) with a maleic acid-modified polypropylene resin ("Admer" (registered trademark) QE840 manufactured by Mitsui Chemicals, Inc.) in a weight ratio of 85/15 was used. The melt viscosity at 200° C. was measured by the method mentioned in the above (7) and found to be was 50 Pa·s.

Polyrotaxane [C]

[C-1] "Cerm (registered trademark)" Superpolymer SH2400P (manufactured by Advanced Soft Materials Corp.: weight-average molecular weight of 400,000; cyclic molecule is α-cyclodextrin; linear molecule is polyethylene glycol having a weight-average molecular weight of 20,000; the blocking group is an adamantane group; the cyclic molecule is modified with a graft chain made of poly(ε-caprolactone))

[C-2] "Cerme (registered trademark)" Superpolymer SH1300P (manufactured by Advanced Soft Materials Co., Ltd.: weight-average molecular weight of 180,000; cyclic molecule is α-cyclodextrin; linear molecule is polyethylene glycol having a weight-average molecular weight of 11,000; blocking group is an adamantane group; cyclic molecule is modified with a graft chain consisting of poly(ε-caprolactone)

Resin [E]

[E-1] A solid bisphenol A-type epoxy resin ("jER" (registered trademark) 1004AF manufactured by Mitsubishi Chemical Corporation, softening point of 97° C.) was used. This was put into a tank in an impregnation auxiliary agent application device, the temperature in the tank was set at 200° C., and then heating was performed for 1 hour to convert it into a molten state. The melt viscosity at 200° C. was measured by the method mentioned in the above (7) and found to be 1 Pa·s. The rate of change in melt viscosity was calculated and found to be 1.1%.

[E-2] A solid hydrogenated terpene resin ("Clearon" (registered trademark) P125 manufactured by Yasuhara Chemical Co., Ltd., softening point of 125° C.) was used. This was put into a tank in an impregnation auxiliary agent coating device, the temperature in the tank was set at 200° C., and then heating was performed for 1 hour to convert it into a molten state. The melt viscosity at 200° C. was measured by the method mentioned in the above (7) and found to be 1 Pa·s. The rate of change in melt viscosity was calculated and found to be 1.2%

Phosphorus-Based Flame Retardant [F]

[F-1] A condensed phosphate ester flame retardant "PX-200" manufactured by Daihachi Chemical Industry Co., Ltd. was used.

[I-1] Carbon black "#3030B (primary particle diameter of 55 nm)" manufactured by Mitsubishi Chemical Corporation was used.

Example 1

The fiber bundle [G], which was obtained by impregnating the carbon fibers [B-1] with the polyrotaxane [C-1] in accordance with Reference Example 2, was allowed to pass through a coating die for electric wire coating use which was placed at the tip of a TEX-30α-model twin screw extruder (screw diameter: 30 mm, L/D=32) (manufactured by Japan Steel Works, LTD.). Separately, the resin composition including the thermoplastic resin [A-1] produced in accordance with Reference Example 4 was supplied through a main hopper of the TEX-30α-type twin screw extruder and then melt-kneaded. The molten product was discharged in a molten state into the coating die and then arranged continuously so as to coat the periphery of the fiber bundle [G] with the resin composition including the thermoplastic resin [A-1]. At this time, the resin pressure as measured by a resin pressure meter attached to a melt kneader was 1 MPa. The amount of the resin composition to be discharged was controlled in such a manner that the contents of various materials at this time became as shown in Table 1 based on 100 parts by weight of the total content of the thermoplastic resin [A], the carbon fibers [B] and the polyrotaxane [C]. The continuous molding material thus produced was cooled and then cut with a cutter to produce a long fiber-pellet-like resin molding material having a length of 7 mm.

The long fiber-pellet-like molding material thus produced was subjected to injection molding using an SE75DUZ-C250-model injection molding machine manufactured by Sumitomo Heavy Industries, Ltd. under the following conditions: an injection time: 2 seconds, a back pressure: 10 MPa, a pressure holding time: 10 seconds, a cylinder temperature: 280° C. and a mold temperature: 90° C. In this manner, ISO-type dumbbell-shaped test specimens, test specimens measuring 80 mm×80 mm×3 mm thick and test specimens measuring 80 mm×10 mm×4 mm thick were produced. The term "cylinder temperature" as used herein refers to a temperature of a part of an injection molding machine at which the molding material is to be melted with heat, and the term "mold temperature" as used herein refers to a temperature of a mold into which the molding material is to be injected in order to form a predetermined shape. The test specimens thus produced were left to stand for 24 hours in a constant temperature and constant humidity chamber conditioned at a temperature of 23° C. and at 50% RH, and were then evaluated by the above-mentioned methods. The evaluation results are shown in Table 1.

Examples 2 to 4 and 10

In the same manner as in Example 1, except that the contents of the components [A] to [C], [F] and [I] were changed as shown in Table 1, long fiber-pellet-like resin molding materials and various molded articles were produced and evaluated. The evaluation results are shown in Table 1.

Example 7

In the same manner as in Example 1, except that the components [A], [F] and [I] were melt-kneaded under a resin pressure of 1 MPa and the molten product was discharged in a molten state into the coating die and then arranged continuously so as to coat the periphery of the fiber bundle [G] with the resin composition including the thermoplastic resin [A-1], long fiber-pellet-like resin molding materials and various molded articles were produced and evaluated. The evaluation results are shown in Table 1.

Examples 5, 6 and 11

The fiber bundle [J], which was obtained by impregnating the carbon fibers [B-1] with the resin [E] in accordance with Reference Example 3, was allowed to pass through a coating die for electric wire coating use which was placed at the tip of a TEX-30α-model twin screw extruder (screw diameter: 30 mm, L/D=32) (manufactured by Japan Steel Works, LTD.). Separately, the resin composition including the thermoplastic resin [A-1] and the rotaxane [C] produced in accordance with Reference Example 4 was supplied through a main hopper of the TEX-30α-type twin screw extruder and then melt-kneaded. The molten product was discharged in a molten state into the coating die and then arranged continuously so as to coat the periphery of the fiber bundle [J] with the resin composition including the thermoplastic resin [A-1] and the rotaxane [C]. At this time, the resin pressure as measured by a resin pressure meter attached to a melt kneader was 1 MPa. In the same manner as in Example 1, except that the amount of the resin composition to be discharged was controlled in such a manner that the contents of various materials at this time became as shown in Table 1 based on 100 parts by weight of the total content of the thermoplastic resin [A], the carbon fibers [B] and the polyrotaxane [C], long fiber-pellet-like resin molding materials and various molded articles were produced and evaluated. The evaluation results are shown in Table 1.

Example 8

In the same manner as in Example 6, except that the components [A], [F] and [I] shown in Table 1 are melt-kneaded under a resin pressure of 1 MPa and the molten product was discharged in a molten state into the coating die and then arranged continuously so as to coat the periphery of the fiber bundle [J] with the resin composition including the thermoplastic resin [A-1] and the rotaxane [C], long fiber-pellet-like resin molding materials and various molded articles were produced and evaluated. The evaluation results are shown in Table 1.

Example 9

In the same manner as in Example 2, except that the length of the long fiver pellet was changed to 14 mm, long fiber-pellet-like resin molding materials and various molded articles were produced and evaluated. The evaluation results are shown in Table 1.

Comparative Examples 1 to 5

In the same manner as in Example 1, except that the contents of the components [A] to [C] were changed as mentioned in Table 2, long fiber-pellet-like resin molding materials and various molded articles were produced and evaluated. The evaluation results are shown in Table 2.

Comparative Example 6

The thermoplastic resin [A-1], the carbon fiber bundle [B-1] and the rotaxane [C] were supplied to a TEX-30α-model twin screw extruder (screw diameter: 30 mm, L/D=32) (manufactured by Japan Steel Works, LTD.) and then melt-kneaded at a screw rotation speed of 200 rpm. The strand to be discharged through the tip of the die was cooled and solidified and then cut into pieces with a pellet length of 7 mm to produce fiber-containing melt-kneaded pellets. At this time, amounts of the thermoplastic resin [A-1], the carbon fibers [B-1] and the polyrotaxane [C] were adjusted to 87.5 parts by weight, 10 parts by weight and 2.5 parts by weight, respectively, based on 100 parts by weight of the total content of the components [A] to [C].

The fiber-containing melt-kneaded pellets thus produced were subjected to injection molding using an SE75DUZ-C250-model injection molding machine manufactured by Sumitomo Heavy Industries, Ltd. under the following conditions: an injection time: 10 seconds, a back pressure: 10 MPa, a pressure holding time: 10 seconds, a cylinder temperature: 300° C. and a mold temperature: 100° C. In this manner, ISO-type tensile dumbbell-shaped test specimens, test specimens measuring 80 mm×80 mm×3 mm thick and test specimens measuring 80 mm×10 mm×4 mm thick were produced. The term "cylinder temperature" as used herein refers to a temperature of a part of an injection molding machine at which the molding material is to be melted with heat, and the term "mold temperature" as used herein refers to a temperature of a mold into which the molding material is to be injected in order to form a predetermined shape. The test specimens thus produced were left to stand for 24 hours in a constant temperature and constant humidity chamber conditioned at a temperature of 23° C. and at 50% RH, and were then evaluated by the above-mentioned methods. The evaluation results are shown in Table 2.

TABLE 1

| | | | | Example 1 | Example 2 | Example 3 | Example 4 | Example 5 | Example 6 |
|---|---|---|---|---|---|---|---|---|---|
| Raw material | Thermoplastic resin [A] | Type | — | A-1 | A-1 | A-1 | A-1 | A-1 | A-1 |
| | | Amount | Parts by weight | 87.5 | 75.0 | 79.0 | 70.0 | 87.5 | 75.0 |
| | Carbon fibers [B] | Type | — | B-1 | B-1 | B-1 | B-1 | B-1 | B-1 |
| | | Amount | Parts by weight | 10.0 | 20.0 | 20.0 | 20.0 | 10.0 | 20.0 |
| | Polyrotaxane [C] | Type | — | C-1 | C-1 | C-1 | C-1 | C-2 | C-2 |
| | | Amount | Parts by weight | 2.5 | 5.0 | 1.0 | 10.0 | 2.5 | 5.0 |
| | Amount of [C] based on [B] | — | — | 0.25 | 0.25 | 0.05 | 0.50 | 0.25 | 0.25 |
| | Resin [E] | Type | — | — | — | — | — | E-1 | E-1 |
| | | Amount | Parts by weight | — | — | — | — | 2.6 | 5.3 |
| | Phosphorus-based flameretardant [F] | Type | — | — | — | — | — | — | — |
| | | Amount | Parts by weight | — | — | — | — | — | — |
| | Carbon black [I] | Type | — | — | — | — | — | — | — |
| | | Amount | Parts by weight | — | — | — | — | — | — |
| Molding material | Pellet length | mm | | 7.0 | 7.0 | 7.0 | 7.0 | 7.0 | 7.0 |
| | Length of fibers included | mm | | 7.0 | 7.0 | 7.0 | 7.0 | 7.0 | 7.0 |
| Molded article | Weight-average fiber length | $L_w$ (measured value) mm | | 0.8 | 0.7 | 0.5 | 0.9 | 0.7 | 0.6 |
| | Fiber dispersibility | — | | B | B | B | B | A | A |
| Evaluation of physical properties | Charpy impact strength | kJ/m$^2$ | | 20.0 | 25.0 | 17.0 | 28.0 | 19.0 | 24.0 |
| | Bending strength | MPa | | 110.0 | 140.0 | 170.0 | 120.0 | 130.0 | 150.0 |
| | Bending elastic modulus | GPa | | 6.0 | 13.0 | 17.0 | 10.0 | 7.0 | 15.0 |
| | Volume resistivity | Ω · cm | | $10^0$ | $10^0$ | $10^0$ | $10^0$ | $10^1$ | $10^0$ |
| | Drop-weight impact absorption energy | J | | 14.0 | 20.0 | 17.0 | 25.0 | 15.0 | 23.0 |

| | | | | Example 7 | Example 8 | Example 9 | Example 10 | Example 11 |
|---|---|---|---|---|---|---|---|---|
| Raw material | Thermoplastic resin [A] | Type | — | A-1 | A-1 | A-1 | A-2 | A-2 |
| | | Amount | Parts by weight | 75.0 | 75.0 | 75.0 | 75.0 | 75.0 |
| | Carbon fibers [B] | Type | — | B-1 | B-1 | B-1 | B-1 | B-1 |
| | | Amount | Parts by weight | 20.0 | 20.0 | 20.0 | 20.0 | 20.0 |
| | Polyrotaxane [C] | Type | — | C-1 | C-2 | C-1 | C-1 | C-2 |
| | | Amount | Parts by weight | 5.0 | 5.0 | 5.0 | 5.0 | 5.0 |
| | Amount of [C] based on [B] | — | — | 0.25 | 0.25 | 0.25 | 0.25 | 0.25 |
| | Resin [E] | Type | — | — | E-1 | — | — | E-2 |
| | | Amount | Parts by weight | — | 5.3 | — | — | 5.3 |
| | Phosphorus-based flameretardant [F] | Type | — | F-1 | F-1 | — | — | — |
| | | Amount | Parts by weight | 10.0 | 10.0 | — | — | — |
| | Carbon black [I] | Type | — | I-1 | I-1 | — | — | — |
| | | Amount | Parts by weight | 1.1 | 1.1 | — | — | — |
| Molding material | Pellet length | mm | | 7.0 | 7.0 | 14.0 | 7.0 | 7.0 |
| | Length of fibers included | mm | | 7.0 | 7.0 | 14.0 | 7.0 | 7.0 |
| Molded article | Weight-average fiber length | $L_w$ (measured value) mm | | 0.9 | 0.8 | 10.0 | 1.0 | 0.9 |
| | Fiber dispersibility | — | | B | A | B | B | A |

TABLE 1-continued

| | | | | | | | |
|---|---|---|---|---|---|---|---|
| Evaluation of physical properties | Charpy impact strength | kJ/m² | 18.0 | 17.0 | 30.0 | 20.0 | 19.0 |
| | Bending strength | MPa | 130.0 | 110.0 | 170.0 | 100.0 | 120.0 |
| | Bending elastic modulus | GPa | 10.0 | 14.0 | 17.0 | 10.0 | 12.0 |
| | Volume resistivity | Ω·cm | $10^{-1}$ | $10^{-1}$ | $10^{-1}$ | $10^{0}$ | $10^{0}$ |
| | Drop-weight impact absorption energy | J | 20.0 | 21.0 | 28.0 | 13.0 | 15.0 |

TABLE 2

| | | | | Comparative Example 1 | Comparative Example 2 | Comparative Example 3 | Comparative Example 4 | Comparative Example 5 | Comparative Example 6 |
|---|---|---|---|---|---|---|---|---|---|
| Raw material | Thermoplastic resin [A] | Type | — | A-1 | A-1 | A-1 | A-1 | A-1 | A-1 |
| | | Amount | Parts by weight | 90.0 | 95.0 | 50.0 | 79.9 | 79.9 | 87.5 |
| | Carbon fibers [B] | Type | — | B-1 | — | B-1 | B-1 | B-1 | B-1 |
| | | Amount | Parts by weight | 10.0 | — | 20.0 | 20.0 | 20.0 | 10.0 |
| | Polyrotaxane [C] | Type | — | — | C-1 | C-1 | C-1 | C-1 | C-1 |
| | | Amount | Parts by weight | — | 5.0 | 30.0 | 0.10 | 0.09 | 2.5 |
| | Amount of [C] relative to [B] | — | — | — | — | 1.50 | 0.0050 | 0.0045 | 0.25 |
| | Resin [E] | Type | — | — | — | — | — | — | — |
| | | Amount | Parts by weight | — | — | — | — | — | — |
| | Phosphorus-based flame retardant [F] | Type | — | — | — | — | — | — | — |
| | | Amount | Parts by weight | — | — | — | — | — | — |
| | Carbon-based filler [I] | Type | — | — | — | — | — | — | — |
| | | Amount | Parts by weight | — | — | — | — | — | — |
| Molding material | Pellet length | | mm | 7.0 | 7.0 | 7.0 | 7.0 | 7.0 | 7.0 |
| | Length of fibers included | | mm | 7.0 | 7.0 | 7.0 | 7.0 | 7.0 | 0.4 |
| Molded article | Weight-average fiber length | $L_w$ (measured value) | mm | 0.8 | — | 0.9 | 0.7 | 0.6 | 0.2 |
| | Fiber dispersibility | | — | B | A | B | B | B | A |
| Evaluation of physical properties | Charpy impact strength | | kJ/m² | 8.0 | NB | 30.0 | 9.0 | 8.0 | 4.0 |
| | Bending strength | | MPa | 150.0 | 80.0 | 90.0 | 150.0 | 155.0 | 75.0 |
| | Bending elastic modulus | | GPa | 8.0 | 2.0 | 5.0 | 16.0 | 16.0 | 4.0 |
| | Volume resistivity | | Ω·cm | $10^{2}$ | $>10^{8}$ | $10^{0}$ | $10^{2}$ | $10^{3}$ | $>10^{8}$ |
| | Drop-weight impact absorption energy | | J | 7.0 | >50 | 25.0 | 8.0 | 8.0 | 5.0 |

All the molded articles of Examples 1 to 6, 10 and 11 exhibited excellent impact strength and conductivity. Moreover, the molded articles of Examples 7 and 8 further include carbon black [I], so that the volume resistivity decreased and the conductivity was improved. Moreover, in the molded article of Example 9, by adjusting the pellet length of the resin molding material to 14 mm, the weight-average fiber length [$L_w$] of the carbon fibers [B] in the molded article increased, and the molded article exhibited more excellent impact strength and conductivity.

Meanwhile, since the molded article of Comparative Example 1 did not include the polyrotaxane [C], both the impact strength and the volume resistivity were degraded. Since the molded article of Comparative Example 2 did not include the carbon fibers [B], the volume resistivity decreased. In the molded article of Comparative Example 3, since the content of the polyrotaxane [C] was excessive as compared with to the content of the carbon fibers [B], the bending strength of the molded article was degraded. Since the molded articles of Comparative Examples 4 and 5 included a small amount of the polyrotaxane [C], the impact strength and the drop-weight impact absorbed energy were degraded. In the molded article of Comparative Example 6, the carbon fibers [A] included in the molding material have a small length, and as a result, the residual fiber length [$L_w$] in the molded article decreased, leading to degradation of the impact strength.

DESCRIPTION OF REFERENCE SIGNS

1: Thermoplastic resin
2: Carbon fibers (black part)
3: Polyrotaxane (white part)
4: Fiber bundle

The invention claimed is:

1. A fiber reinforced thermoplastic resin molded article comprising a thermoplastic resin [A], carbon fibers [B] and a polyrotaxane [C], the thermoplastic resin [A], the carbon fibers [B] and the polyrotaxane [C] being included in amounts of 40 to 98 parts by weight, 1 to 40 parts by weight and 1 to 20 parts by weight, respectively, based on 100 parts by weight of the total content of the thermoplastic resin [A], the carbon fibers [B] and the polyrotaxane [C], wherein the carbon fibers [B] included in the molded article have a weight-average fiber length [Lw] in a range of 0.5 to 20 mm, and a ratio ([C]/[B]) of the content of the polyrotaxane [C] to that of the carbon fibers [B] is 0.04 or more and 0.5 or less.

2. The fiber reinforced thermoplastic resin molded article according to claim 1, wherein the thermoplastic resin [A] is at least one resin selected from the group consisting of a polycarbonate resin, a polyolefin resin, a polyamide resin and a polyarylene sulfide resin.

3. A fiber reinforced thermoplastic resin molding material comprising a thermoplastic resin [A], carbon fibers [B] and a polyrotaxane [C], the thermoplastic resin [A], the carbon fibers [B] and the polyrotaxane [C] being included in amounts of 40 to 98 parts by weight, 1 to 40 parts by weight and 1 to 20 parts by weight, respectively, based on 100 parts by weight of the total content of the thermoplastic resin [A], the carbon fibers [B] and the polyrotaxane [C], wherein a ratio ([C]/[B]) of the content of the polyrotaxane [C] to that of the carbon fibers [B] is 0.04 or more and 0.5 or less, and the length of the carbon fibers [B] and the length of the fiber reinforced thermoplastic resin molding material are substantially the same.

4. The fiber reinforced thermoplastic resin molding material according to claim 3, wherein the fiber reinforced thermoplastic resin molding material has a core-sheath structure, a core portion includes a polyrotaxane [C] and carbon fibers [B], the core portion is in a state where each single fiber of the carbon fibers [B] is dispersed in the rotaxane [C], and a sheath portion includes a thermoplastic resin [A].

5. The fiber reinforced thermoplastic resin molding material according to claim 3, wherein the fiber reinforced thermoplastic resin molding material has a core-sheath structure, a core portion includes carbon fibers [B], and a sheath portion includes a thermoplastic resin [A] and a polyrotaxane [C].

6. The fiber reinforced thermoplastic resin molding material according to claim 3, wherein the thermoplastic resin [A] is at least one resin selected from the group consisting of a polycarbonate resin, a polyolefin resin, a polyamide resin and a polyarylene sulfide resin.

* * * * *